US006690391B1

(12) United States Patent
Proehl et al.

(10) Patent No.: US 6,690,391 B1
(45) Date of Patent: Feb. 10, 2004

(54) MODAL DISPLAY, SMOOTH SCROLL GRAPHIC USER INTERFACE AND REMOTE COMMAND DEVICE SUITABLE FOR EFFICIENT NAVIGATION AND SELECTION OF DYNAMIC DATA/OPTIONS PRESENTED WITHIN AN AUDIO/VISUAL SYSTEM

(75) Inventors: Andrew M. Proehl, San Francisco, CA (US); Jan-Christoph Zoels, Brooklyn, NY (US); Anne Hyan Jin Kim, Douglaston, NY (US); Yutaka Hasegawa, Tokyo (JP)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 411 days.

(21) Appl. No.: 09/615,871

(22) Filed: Jul. 13, 2000

(51) Int. Cl.[7] .................................................. G09G 5/00
(52) U.S. Cl. ............................ 345/720; 725/40; 725/56
(58) Field of Search ................................. 345/719–722, 345/853–855, 727–729, 830, 841–843, 810; 725/37–61

(56) References Cited

U.S. PATENT DOCUMENTS

| | | | | |
|---|---|---|---|---|
| 5,530,455 A | * | 6/1996 | Gillick et al. | 345/163 |
| 5,793,366 A | | 8/1998 | Mano et al. | 345/329 |
| 5,903,314 A | | 5/1999 | Niijima et al. | 348/564 |
| 5,956,035 A | | 9/1999 | Sciammarella et al. | 345/353 |
| 5,973,682 A | | 10/1999 | Saib et al. | 345/327 |
| 6,005,562 A | * | 12/1999 | Shiga et al. | 345/721 |
| 6,020,930 A | | 2/2000 | Legrand | 348/569 |
| 6,028,600 A | | 2/2000 | Rosin et al. | 345/327 |
| 6,034,677 A | | 3/2000 | Noguchi et al. | 345/327 |
| 6,072,483 A | | 6/2000 | Rosin et al. | 345/335 |
| 6,128,009 A | * | 10/2000 | Ohkura et al. | 725/46 |
| 6,445,398 B1 | * | 9/2002 | Gerba et al. | 345/721 |
| 6,452,609 B1 | * | 9/2002 | Katinsky et al. | 345/716 |

OTHER PUBLICATIONS

Toshiba, Owner's Manual, 1998, Toshiba Corporation, pp. 1–3.*
Mitsubishi, Installation and Operation Manual, 1990, Mitsubishi Corporation, pp. 1–2.*

* cited by examiner

*Primary Examiner*—Kristine Kincaid
*Assistant Examiner*—Le V Nguyen
(74) *Attorney, Agent, or Firm*—Miller Patent Services; Jerry A. Miller

(57) ABSTRACT

The efficient and intuitive presentation, navigation, and selection of AV information in a graphical user interface (GUI) displayed on a display apparatus of an AV system. Related AV information is organized as items within lists that correspond to various navigable fields of a status bar of the GUI during the GUI interactive mode. A highlighted navigable field of the status bar displays its list of related AV information and the items of the list are scrolled through the navigable field by a user causing a scrolling cylinder of a navigation and selection device to move in a scroll. A different field of the status bar may be selected by the user moving the scrolling cylinder in a lateral movement. Activation of the selection mechanism of the navigation and selection device will cause an AV device to be controlled in accordance with the currently displayed AV options.

28 Claims, 19 Drawing Sheets

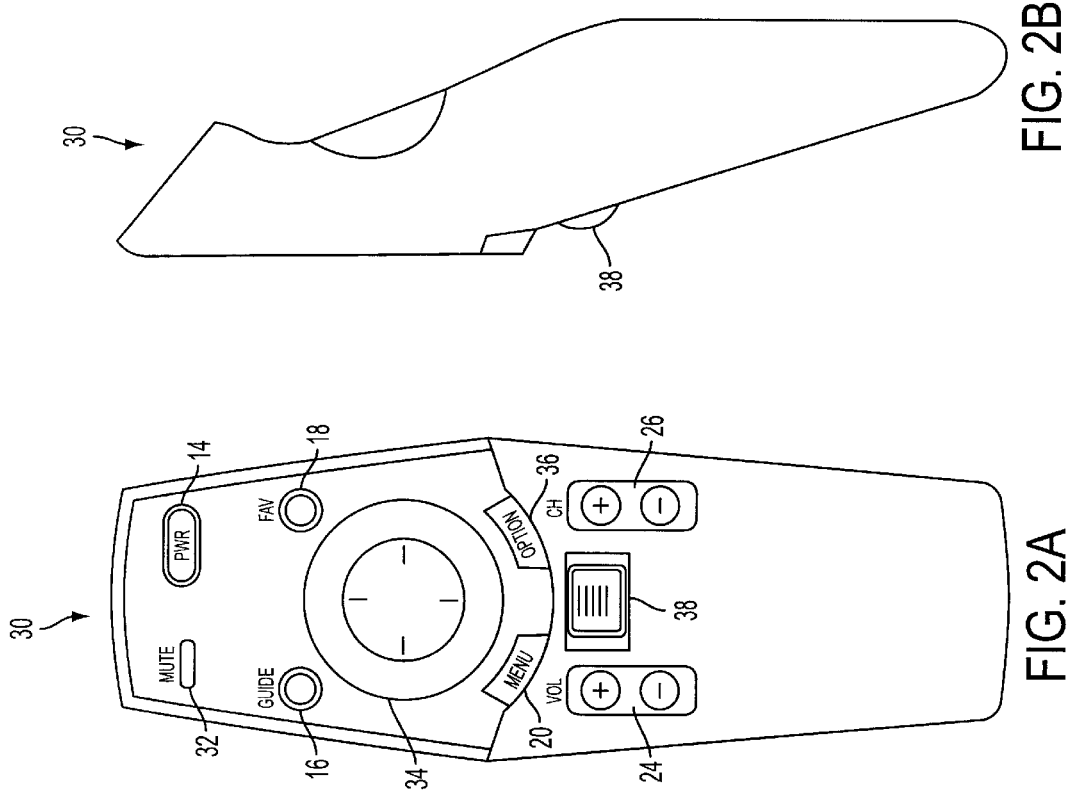

MODAL DISPLAY, SMOOTH SCROLL GRAPHIC USER INTERFACE AND REMOTE COMMAND DEVICE SUITABLE FOR EFFICIENT NAVIGATION AND SELECTION OF DYNAMIC DATA/OPTIONS PRESENTED WITHIN AN AUDIO/VISUAL SYSTEM

FIELD OF THE INVENTION

This invention relates generally to the use of audio/visual (AV) information on display apparatus of AV systems, and more particularly to the efficient and intuitive presentation, navigation, and selection of available AV information in a graphical user interface (GUI) that is displayed on a display apparatus of an AV system and controlled through judicious manipulation of a scrolling mechanism and selection mechanism of a navigation and selection device of the AV system.

BACKGROUND OF THE INVENTION

The continued growth of the numerous AV options available for viewing and/or listening by users of AV systems, has made it necessary and desirable for the users of such AV systems to be able to efficiently and intuitively navigate through the available AV options in order to select desired programming. The explosion in the number of cable, satellite and digital television viewing choices, as well as the emergence of Internet websites dedicated to programming and music that are now available for viewing on television and computer screens via the airwaves, cable, and satellite, has made it necessary and desirable for the user to be able to easily navigate through more and more AV options. It is noted that the term "AV" as used herein may encompass solely audio, solely visual, or a combination of audio/visual.

Consider, for instance, that as the number and availability of broadcast channels for viewing on multiple channel television broadcast systems has continued to proliferate at an astonishing rate, the problem of navigating through the morass of available viewing selections has correspondingly become of more and more concern to the viewers of such systems. The sources of such programming can today provide hundreds of stations to viewers who must navigate through myriad broadcasting choices, a prospect that is both time-consuming and frustrating.

Many on-screen guides, such as electronic program guides (EPGs), allow the user presented with AV programming options to navigate options through the use of four-way directional buttons and a selection button. This is a cumbersome and unsatisfactory solution, however, in that it requires the user to use these buttons many times to reach a desired on-screen option in the guide. There currently exists a need in the art, therefore, to be able to quickly view available AV options and information of an AV system. There additionally is a need in the art to be able to quickly and intuitively navigate the AV options and information of the AV system.

SUMMARY OF THE INVENTION

It is accordingly an object of the invention to be able to quickly and intuitively view, navigate, and select available AV options and information of an AV system.

Therefore, according to the present invention, an improved method, navigation and selection device, GUI and system are presented. In an AV system having one or more AV devices, a display apparatus capable of displaying interactive AV information, a navigation and selection device having an integral scrolling mechanism, and a GUI displayed on the display apparatus, a user of the system is able to quickly, intuitively, and efficiently navigate available AV options displayed during an interactive mode of the GUI through appropriate manipulation of the scrolling mechanism. Related AV options are organized by management software of the navigation and selection device as items within lists that, in turn, correspond to navigable fields of a status bar of the GUI during the GUI interactive mode. The AV options of a list are related in the sense that they will generally share one or more identifiable characteristics. A field of the status bar that is highlighted by a cursor of the GUI will display its list of related AV information options arranged as items within the list, assuming the highlighted field is navigable. Items within the list may be navigated by the user simply engaging the scrolling mechanism of the navigation and selection device to scroll the items through the highlighted field of the GUI status bar. A different field of the status bar may be selected by the user moving the scrolling mechanism in a lateral movement. Activation of the selection mechanism of the navigation and selection device will cause an AV device of the system to be controlled in accordance with the AV options displayed within the status bar fields at the time the selection mechanism is activated.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

FIGS. 1A and 2B are front and side views, respectively, of a navigation and selection device in accordance with a first navigation and selection device embodiment of the present invention.

FIGS. 2A and 2B are front and side views, respectively, of a navigation and selection device in accordance with a second navigation and selection device embodiment of the present invention.

FIGS. 4 to 18 are screen shots of various GUIs in an interactive mode in accordance with the present invention.

DESCRIPTION OF THE INVENTION

Figure 1B:
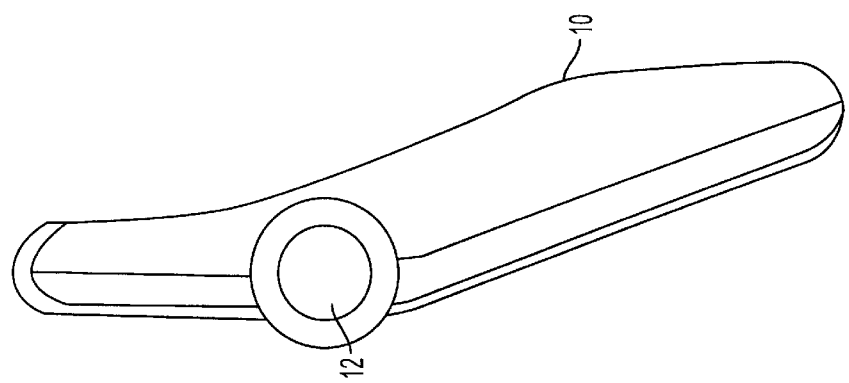

The present invention presents an improved approach, including an improved system, method, navigation and selection device, and GUI, for a user of an AV system to quickly and efficiently navigate through available AV options or choices of the AV system displayed via the GUI on the display apparatus through appropriate manipulation of the scrolling mechanism. The AV system has one or more AV devices, such as televisions, CD players, VCRs, computers, set top boxes, internet applications, etc., a display apparatus capable of displaying interactive menus, guides, and devices controls, a navigation and selection device (remote commander) having an integral scrolling mechanism, and a graphical user interface (GUI) displayed on the display apparatus. The GUI/navigation and selection device combination allows the user to easily navigate AV options that may be presented in a variety of formats, including an electronic program guide (EPG), websites, and AV device menus, on a television screen, monitor, screen or other display apparatus. The scrolling mechanism of the navigation and selection device, together with the organization of related AV information within the GUI, allows the user to quickly and easily navigate the AV information and make desired selections.

Related AV options are organized by software as items within lists that, in turn, correspond to fields of a status bar of the GUI during an interactive mode of the GUI. The software may be implemented as executable computer program instructions of a computer readable medium that, when executed by a processing system, cause the processing system to provide for efficient navigation of available AV options in an AV system. The AV options of a list are related in the sense that they will generally share one or more identifiable characteristics. The AV options displayed as items of a navigable list of a particular field of the status bar may all be types of movies available for viewing, television channels available for viewing, CDs available for listening, AV device controls such as play, stop, fast forward, etc. The available AV viewing and/or listening options that are presented as items within vertical lists are easily scanned and navigated using the scrolling mechanism of the navigation and selection device.

Generally speaking, the fields of the status bar are displayed in the GUI in hierarchical fashion from left to right, with the left-most field representing the broadest category of navigation and selection available to the user and the right-most field representing the narrowest category. Fields to the right of a particular field, then, may generally be considered to be sub-categories or subsets of that particular field, although such is not always the case. When inactive (not highlighted), these fields of a status bar are presented by displaying only the current or last-selected item within a field. When activated (the field is highlighted and the OK/select button is pressed), the field, if navigable, vertically expands to display not only the current or last-selected item but also the entire list of items associated with the field; the navigable list may then be navigated and any item of the list placed within the field of the status bar by the user controlling the scroll wheel to highlight the desired item. A field of the status bar is highlighted by using the lateral movement of the scrolling mechanism to place the GUI cursor over the desired field.

Figure 1A:
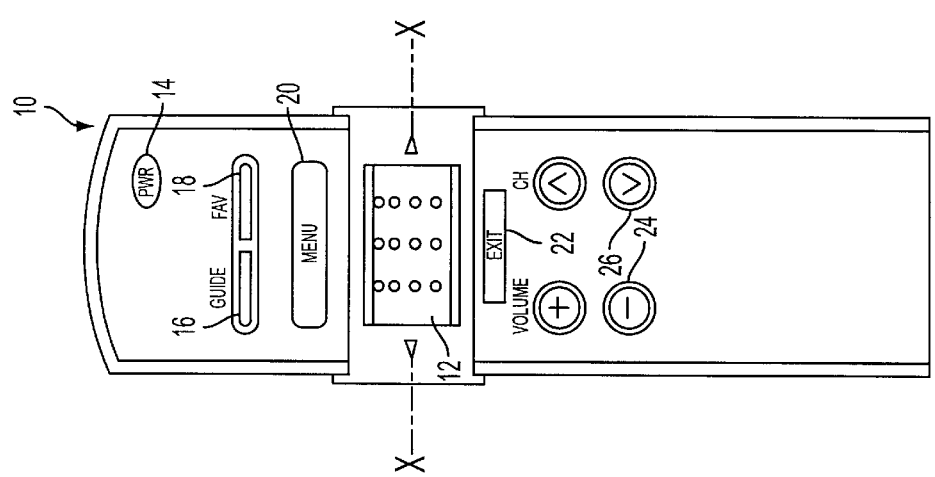

Referring now to FIGS. 1A and 1B, front and side views, respectively, of a first preferred embodiment of navigation and selection device 10, commonly referred to as a remote commander or remote control, which is capable of providing the means by which a user can communicate with a dynamic GUI to control an AV device, are shown. The navigation and selection device 10 may be any remote hardware controller for AV devices, including audio playback. devices, such as Sony's Discman or Walkman, television, cable set-top boxes, VCRs, etc. The navigation and selection device 10 may additionally be a liquid crystal display (LCD)-based remote commander used to control multiple AV devices.

Navigation and selection device 10 features an integral scrolling mechanism, shown here as a scroll wheel or cylinder 12. The user is able to engage in interactive communication with a dynamic GUI by appropriate operation of the navigation and selection device 10. The integrated scroll cylinder is capable of scrolling movement up and down, allowing the user to scroll up and down through vertical fields of related information by simply scrolling the scroll cylinder up or down as will be described. The integrated scroll cylinder additionally is capable of lateral, side-to-side movement, thereby allowing the user to highlight an item of a toolbar of the dynamic GUI as will be described; the side-to-side lateral movement of scroll cylinder 12 is indicated by the presence of arrows pointing to the left and to the right on the remote commander housing. Once the user has manipulated the scroll cylinder to highlight a desired option of the GUI, that option is selected by the user engaging the selection mechanism of the navigation and selection device; in this example, engaging the selection mechanism is accomplished by manually depressing the scroll cylinder in a perpendicular direction with respect to the axis running through the scroll cylinder. In other words, in this embodiment selection operation of the navigation and selection device is accomplished by the user pressing down on scroll cylinder 12 in a direction along the z-axis (into the paper for purposes of illustration) and perpendicular to the x-axis.

Scroll cylinder 12 thus provides smooth scrolling navigation through the available AV options, such as those displayed in an electronic programming guide (EPG), that are presented to the user via the GUI. It is noted, however, that it is not a requirement of the present invention that the scrolling and selection mechanisms of the navigation and selection device be one and the same. Thus, the scroll cylinder 12 could be used solely for navigation while another feature of the navigation and selection device, such as a button, could perform the selection operation. It should be noted that the scroll wheel itself could be rotary encoded, meaning that it rotates with discreet positions, or free rotating.

In addition to a scroll wheel or cylinder, the scrolling mechanism of the remote commander 10 may be provided by alternate scrolling devices offering differing scrolling speeds. Scrolling at variable speeds provides the user with dynamic control of navigation, so that the user may navigate quickly to far away AV choices but more slowly to closer AV options, for instance. Variable speed control movement may be accomplished with a spring-loaded jog shuttle, for example. A rocker switch, of the type commonly used on camcorder zoom buttons, for instance, is typically capable of variable action speeds to scroll much faster than is a scroll wheel and thus may be more suitable for navigating through navigable lists containing a large number of items.

In addition to scroll cylinder 12, navigation and selection device 10 has power button 14, guide button 16, favorite (FAV) button 18, menu button 20, exit button 22, volume control buttons 24, and channel control button 26. Guide button 16 may be manually depressed to cause a EPG to be displayed on a display apparatus, such as a monitor, a television screen, or a screen of an AV device. Favorite button 18 is manually operated to display one or more favorite AV options, such as television channels or audio CD tracks, for instance. Menu button 20 is manually operated to cause a predetermined menu screen to be displayed on the display apparatus. Exit button 22 is manually operated to restore ordinary screen display. Volume control buttons 24 are manually operated to increase or decrease the volume of sound produced by the AV device being controlled by the navigation and selection device 10. Channel control buttons 26 are used to manually control which broadcasting channel is to be received by the AV device.

A second preferred embodiment of a navigation and selection device 30 suitable for controlling an AV device in accordance with the present invention is illustrated in the front and side views, respectively, of FIGS. 2A and 2B. Navigation and selection device 30 which may also be referred to as a remote commander or control, also has an integral scroll cylinder, or wheel, 38, although cylinder 38 is smaller than scroll cylinder 12 of FIGS. 1A and 1B. Also present in this particular embodiment is 4-way joy pad 34, making navigation and selection device 20 very well suited for use with game applications. Navigation and selection device 20 additionally has mute button 32 and option button 36.

In addition to the scroll cylinders shown in FIGS. 1A–1B and 2A–2B, the scrolling mechanism may be fulfilled by other suitable choices, including rocker switches and spring-loaded jog shuttles, for example.

Figure 3:
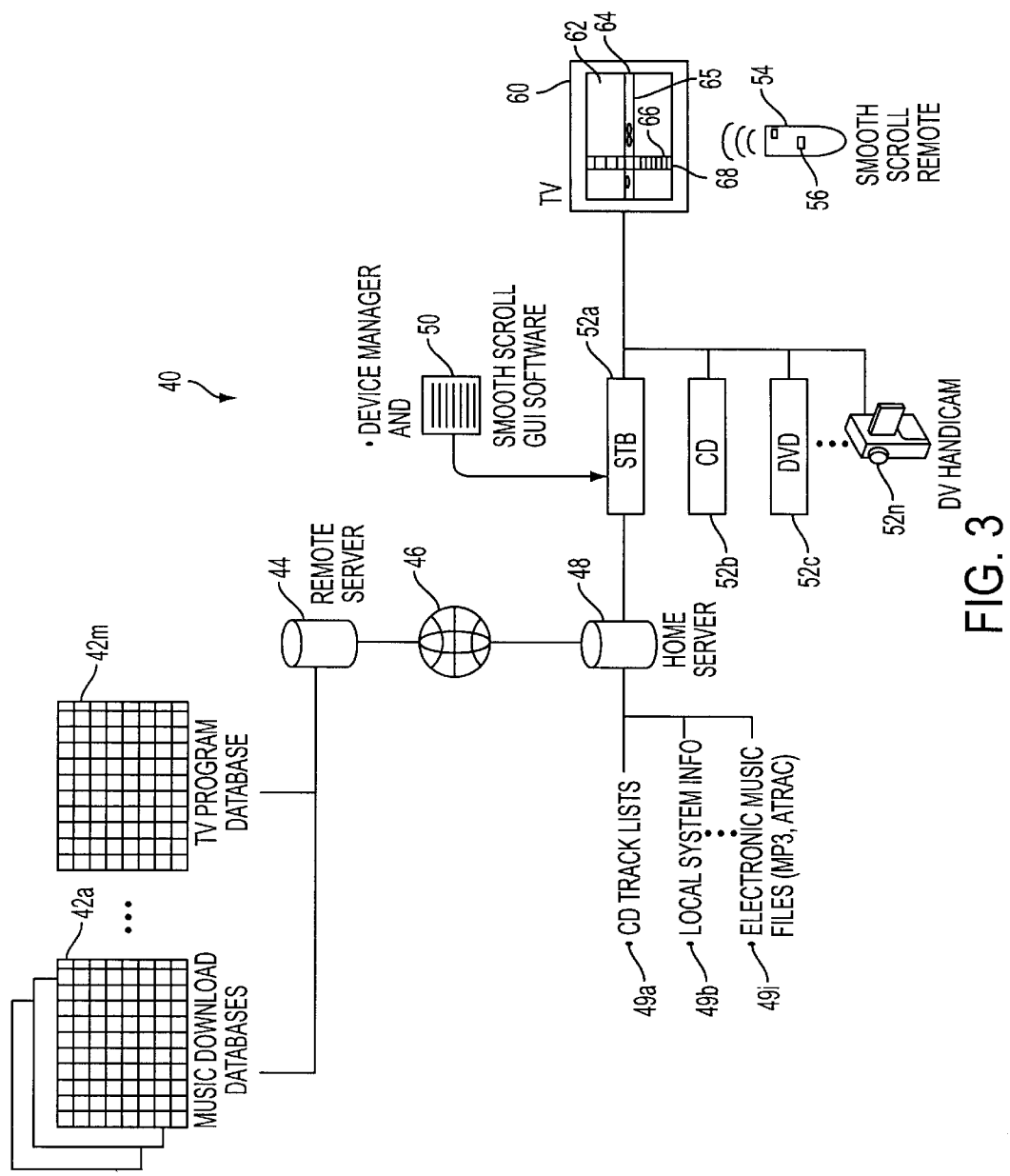
FIG. 3 is an AV system diagram in accordance with an embodiment of the present invention.

FIG. 3 illustrates an example of the AV system, according to an embodiment of the present invention. The AV system 40 has several components used in the invention. AV options available to a user of the system for viewing and/or listening may be remotely or locally available; there are thus two computer servers shown—remote server 44 and home (local) server 48. The related AV options, also referred to as grid information, that will be shown in vertically navigable lists of the GUI 62 are stored in one or more databases on a server, either local or remote, and downloaded as needed. Locally available AV information, shown as local databases 49a–49i, includes, for purposes of illustration, CD Track lists 49a, local system information 49b, and electronic music files 49i, such as those in MP3 or Atrac formats, and is made available on the system to home server 48. Other AV options available for viewing and/or listening may be obtained from a remote server 44 over the world wide web or Internet; remote databases music download databases 42a and television program database 42m (EPG) are examples of AV information that can be downloaded from the remote databases 42 to a remote server 44 before being sent over the Internet 46 to the local server 48 in response to a request. AV options or information include hyperlinks that permit navigation to remote sites on the Internet using the smooth scroll GUI and remote commander of the invention.

AV options, whether obtained locally or over the web, can be played for viewing or listening by the user on the appropriate AV device. This is a good example of how the GUI can be dynamically generated based on receiving structured information from any source. Several types of AV devices capable of displaying interactive menus, guides, and/or device controls are shown here, for purposes of illustration, and include digital cable set top box (STB) 52a, compact disc (CD) player 52b, digital video disc (DVD) player 52c, and DV camcorder device 52n. Other types of AV devices include digital television products, VCRs, etc. The music or AV data sought to be presented to the user of the system may be viewed on a display apparatus of the appropriate AV device 52 (such as a CD played by CD player 52b) or it may be viewed on a display apparatus 60, such as a satellite program viewed on a television screen, a monitor, etc.

The dynamic GUI displayed on display apparatus 60, in conjunction with the smooth scroll navigation and selection device 54, allow the user of the AV system to quickly and easily navigate through the available AV options and select a desired AV option in the manner that will be described. Management software or program 50 manages AV devices 52a . . . 52n as well as the smooth scroll dynamic GUI 62 and preferably resides within navigation and selection device 54. Software 50 ensures that the available AV information options provided to server 48 from source 42 or 49 are available for the dynamic GUI 62 when needed. As previously described, the methodology of software 50 may be implemented as executable computer program instructions of a computer readable medium that, when executed by a processing system, such as might reside within navigation and selection device 54, cause the processing system to provide efficient navigation of available AV options in the AV system.

The user manipulates the integral scrolling mechanism 56 of navigation and selection device 54 to navigate through AV options presented in fields 65 of a status bar 64 that are capable of expanding when highlighted to reveal AV options arranged as items 66 within a vertically navigable list 68. As previously mentioned, scrolling mechanism 56 is capable of lateral movement and scrolling movement, and additionally has a selection mechanism by which desired AV information contained within the status bar 64 may be selected.

There are two modes of the dynamic GUI, each of which present different types of information to the user. The user controls the mode of the dynamic GUI through appropriate manipulation of the remote commander navigation and selection device. The information display mode of the GUI, activated by the user depressing an appropriate information button of the remote commander, or by moving the scroll wheel or cylinder 12, 38 in any direction without activating its selection mechanism, causes certain information to be displayed on the display apparatus. The user is not interactive with the GUI in the information display mode; rather, certain predetermined information, such as information about the current or last-selected AV option, is simply displayed to the user. The second mode of the dynamic GUI is the interactive mode, during which the user is able to communicate with the GUI. The interactive mode is entered by the user activating the selection mechanism of the navigation and selection device, in this embodiment by depressing the scroll cylinder of the remote commander in a downward direction. It is noted that the interactive mode may be launched from the information display mode or it may be entered directly by activation of the selection mechanism.

Figure 4:
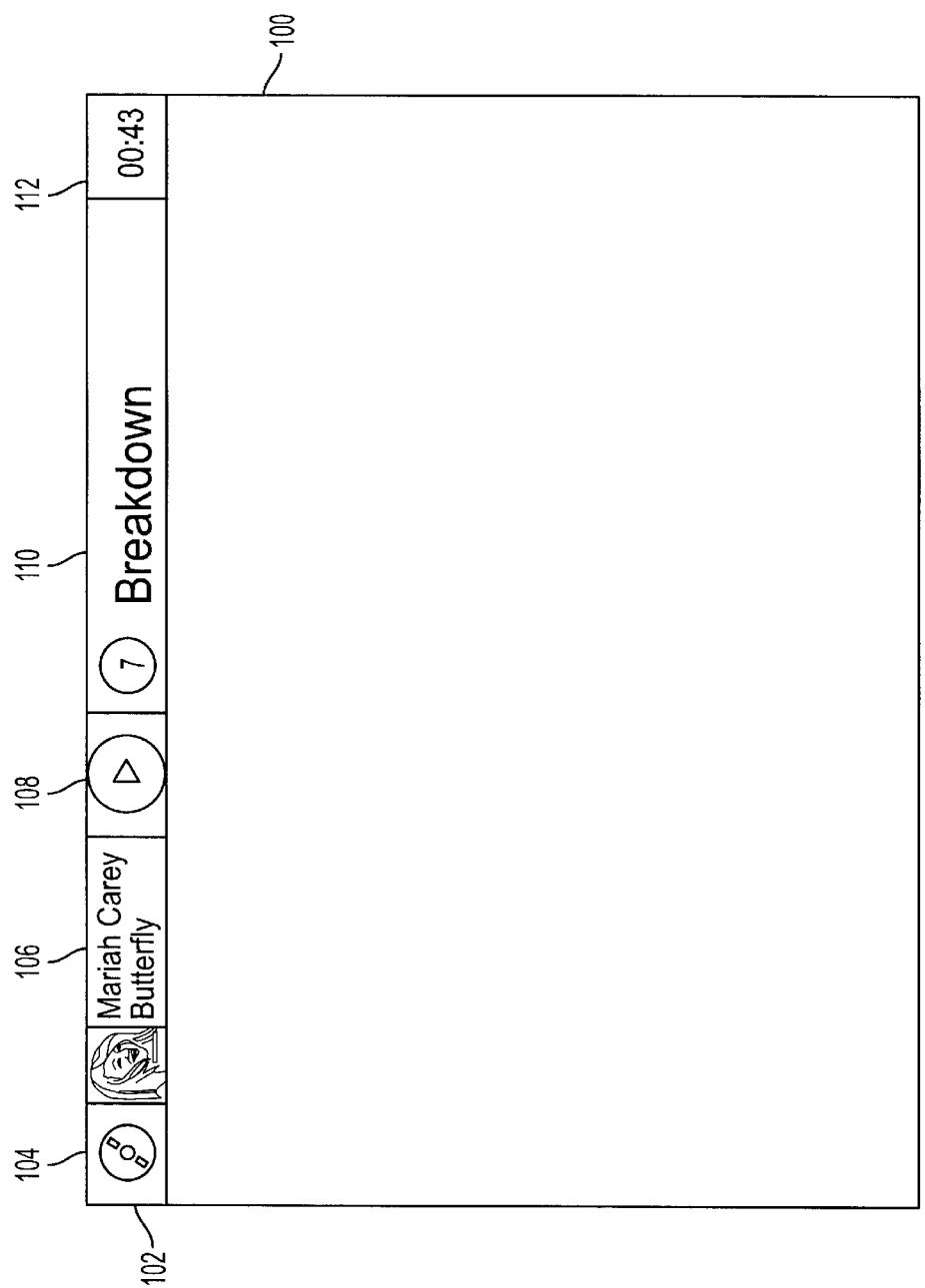
FIG. 4 is a screen shot of a GUI in an information display mode in accordance with the present invention.

FIG. 4 is a representation of the information display mode of the dynamic GUI 100 presented to the user on a display apparatus, according to an embodiment of the present invention. The information display mode is activated by the user moving the scroll cylinder of the remote commander without depressing it or by the user depressing an appropriate information button of the remote commander to enter the mode. Activation of the GUI information display mode causes the dynamic GUI 100 to display a status bar 102 that provides the user with information specifically about the AV option currently or last selected by the user, whether it be a television channel, DVD movie, CD audio track, etc.; in this example, the selected AV option is a track of a particular music CD, so the information displayed in the status bar 102 concerns selected music CD. Again, because the user has not caused the GUI to enter the interactive mode, the only information available to the user in the information display mode concerns the status of the current or last-selected AV option. It should be noted that if the user does not enter the interactive mode of the GUI after a certain period of time, such as 4 seconds, a time-out feature of the GUI will cause the GUI to no longer be displayed on the display apparatus.

The status bar in this particular implementation has a number of non-navigable fields 104, 106, 108, 110, and 112 (as opposed to the navigable fields provided in the interactive mode) displayed at the top of the GUI window 100; the term non-navigable fields refers to the fact that, since the fields 104–112 only convey information about the currently selected AV option, there is only one item displayed per field, rendering them non-navigable. As will be described, the user can choose to learn more about any field by highlighting a desired field in the status bar with the scroll cylinder (using the lateral movement of the scrolling mechanism to move the cursor of the GUI over the field to be highlighted) and then depressing the scroll cylinder downward to select the highlighted field, thereby entering the GUI interactive mode; the non-navigable field currently highlighted in this GUI screen shot is the CD Track Field 110, as indicated by the thicker white line that surrounds this field. The highlighting and subsequent selection of any particular non-navigable field within the status bar causes the GUI to enter the interactive mode in which the highlighted field transitions from a non-navigable field to a vertically navigable field having one or more related navigation and selection AV options arranged as items within a list of the vertically navigable field, assuming that the particular field does indeed have multiple, related AV options that can be navigated and selected if desired.

The fields 104–112 of status bar 102 are arranged in an easily readable fashion, such as along the top of the GUI screen from left to right in horizontal formation, preferably in a non-prominent position of the GUI. In this particular embodiment, it can be seen that the status bar is displayed at the very top of the GUI in what may be considered to be a non-prominent position of the screen so as to minimize any distraction caused by the status bar; if the GUI subsequently is caused to go from the information display mode to the interactive mode, the status bar will assume a more prominent position in the GUI screen.

Generally speaking, in both the information display mode and the interactive modes of operation of the GUI, the fields of a status bar displayed in the GUI are displayed in hierarchical fashion from left to right, with the left-most field representing the broadest category of navigation and selection available to the user and the rightmost field representing the narrowest category. Fields to the right of a particular field, then, may generally be considered to be sub-categories or subsets of that particular field, although not every move to the right in the status bar indicates a further subdivision in the hierarchy. Thus, in the illustration of FIG. 4, Title Field 106 is a sub-category or subset of Application Field 104, Track Field 110 is a subset of Title Field 106, and Time Field 112 is a subset of Track Field 110. AV Device Control Field 108, while a sub-category of Application Field 104, however, is not hierarchically smaller than Title Field 106.

The symbol within Application Field 104 of the status bar 102 indicates that the application of the currently selected AV option is a CD. The name of the current CD is indicated in Title Field 106 as the Mariah Carey "Butterfly" album; there also is artwork associated with the album displayed in Field 106. AV Device Control Field 108 indicates that the control status of the AV device being controlled by the navigation and selection remote commander device, a CD player in this example, is that the CD player is currently playing the Mariah Carey "Butterfly" CD. Track Field 110 indicates that track number 7, entitled "Breakdown," is currently playing. Time Field 112 indicates that 43 seconds of the song "Breakdown" have been played by the AV device, the CD player.

Figure 5:
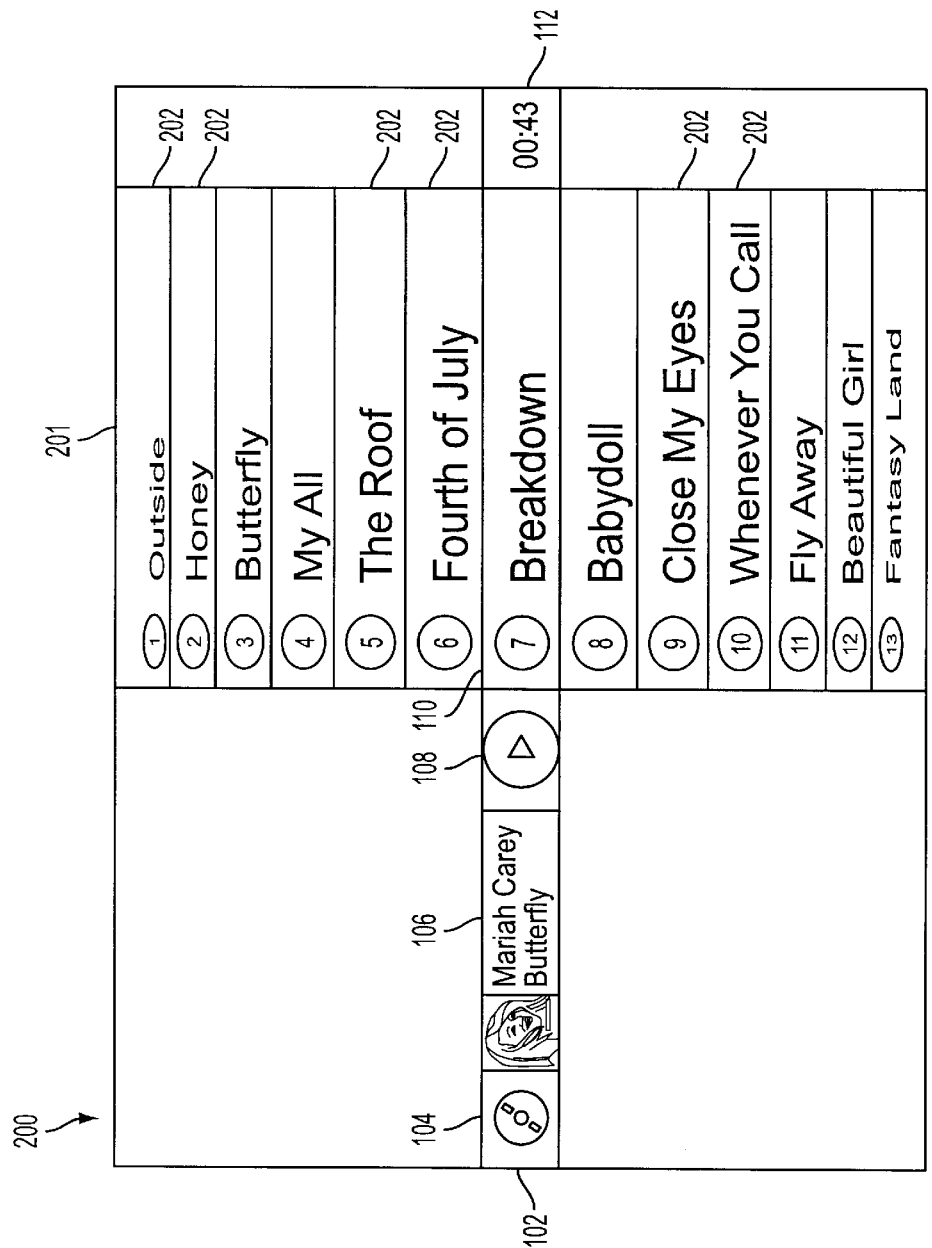

FIG. 5 illustrates the dynamic GUI in the interactive mode. As previously described, the GUI was initially launched by the user moving the scroll cylinder 12, 38 or depressing an information button of the remote commander navigation and selection device 10, 30. Entry into the GUI interactive mode preferably causes the status bar to move from the top, non-prominent position of the GUI (shown in FIG. 4) to a more prominent position within the GUI, such as the center of the GUI window as shown here. Movement of the status bar to a more prominent position as interactive mode status bar 102 allows it to become the primary point of visual focus when viewed on the display apparatus, even when the display apparatus is viewed from across a room, for instance. The status bar field highlighted during the information display mode was the Track Field 110, indicated by the broader white line around that field. Selection of Track Field 110, and thus subsequent entry into the interactive mode shown in FIG. 5, causes the previously non-navigable Track Field 110 to transition into a vertically navigable field having one or more navigation and selection options arranged as items 202 within a list 201 of the vertically navigable field 110. Of course, if Track Field 110 only had one navigation and selection option, it would not truly be a navigable field. Additionally, only one navigable field of the fields 104–112 of status bar 102 may have its vertically navigable field displayed at any given time and that is the field that is currently highlighted by causing the cursor of the GUI to be placed over the field through lateral movement of the scroll cylinder. It is noted that all fields of status bar 102 that have one or more navigation and selection options are potentially navigable fields while in the GUI interactive mode.

The navigation and selection options of Track Field 110 include the tracks available for listening. In this example, the "Butterfly" CD has 13 tracks as AV options available to the user of the system by simply selecting the correct one. While all 13 CD tracks are displayed to the user via the GUI, the list of available navigation and selection options (items) within any particular navigable field may be more number and thus may not all be viewable to the user without appropriate manipulation of the scroll cylinder to scroll through the available choices. For instance, if the user had selected to see all available cable television channels, the navigable field for cable television channels could be 200, 500, or more channel options available for navigating and selecting by the user. The remote commander scroll cylinder of the present invention allows the user to quickly and easily navigate and select, if desired, a great number of choices listed as items in any particular navigable field. Manipulating the scroll cylinder of the remote commander to scroll up or down through the list causes the data to move through the stationery cursor located over the highlighted Track Field 110 of status bar 102. The speed with which scrolling through a navigable vertical list may be accomplished depends upon the type of scrolling mechanism integrated into the remote commander navigation and selection device. A rocker switch will allow a user to scroll much more quickly than a scroll wheel or cylinder and is thus particularly well suited for lists having a large number of items. Thus, for instance, a rocker switch may be the preferred scrolling mechanism for a remote commander of a television application while a scroll wheel scrolling mechanism may be suitable for the remote commander of a CD player/changer.

Figure 6:
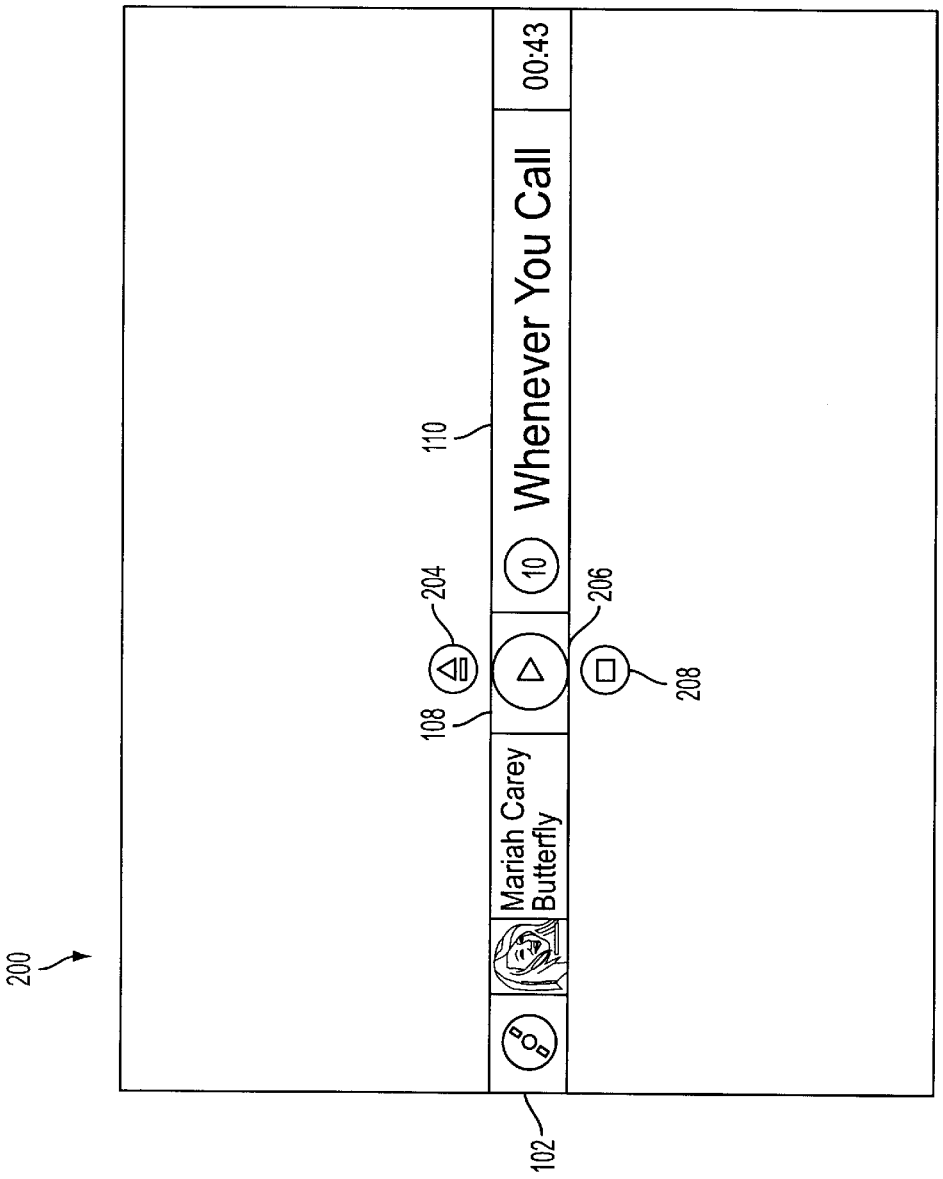

Referring now to FIG. 6, it can be seen that the user has scrolled down to place track item number 10, entitled "Whenever You Call," within the status bar field, causing this track to be highlighted. This track number 10 has subsequently been selected by the user pressing down on the scroll cylinder; the track is now displayed via the GUI as the current CD track being played from the "Butterfly" album. The user has moved beyond Track Field 110 and has now highlighted the AV Device Control Field 108. Because the GUI is in the interactive mode, the available navigation and selection options, arranged as items 204, 206, 208 within navigable field 108, are automatically shown when navigable field 108 is highlighted with the scroll cylinder. Again, as in FIG. 5, only the vertically navigable list of the highlighted field is illustrated at any given time. Item 204 is the Eject CD option, item 106 is the Play option, and item 108 is the Stop option within AV Device Control Field 108. The user may decide to eject the "Butterfly" CD, play selected track 10 called "Whenever You Call", or stop the track simply by using the scroll cylinder to cause the desired AV control action to be highlighted within the status bar and then selecting that control action by pressing down on the scroll cylinder.

Figure 7:
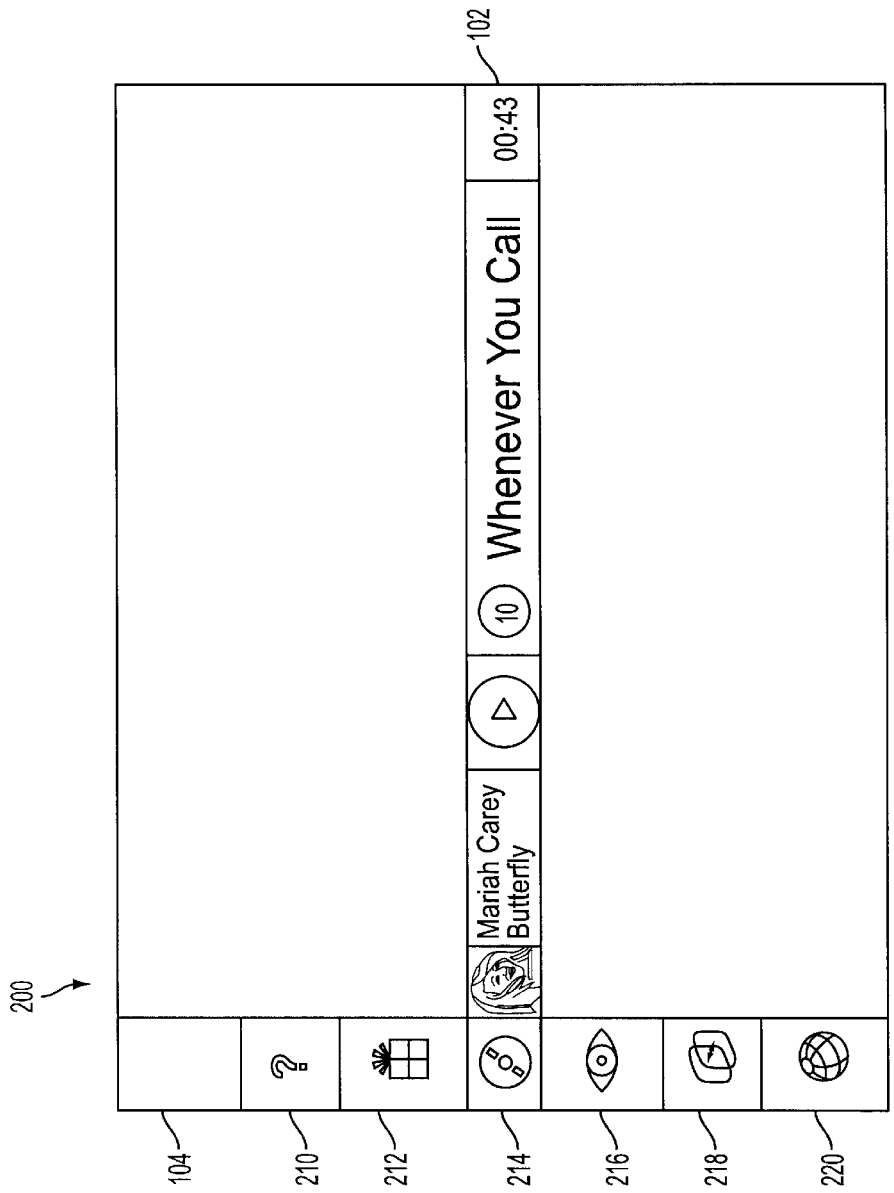
Figure 8:
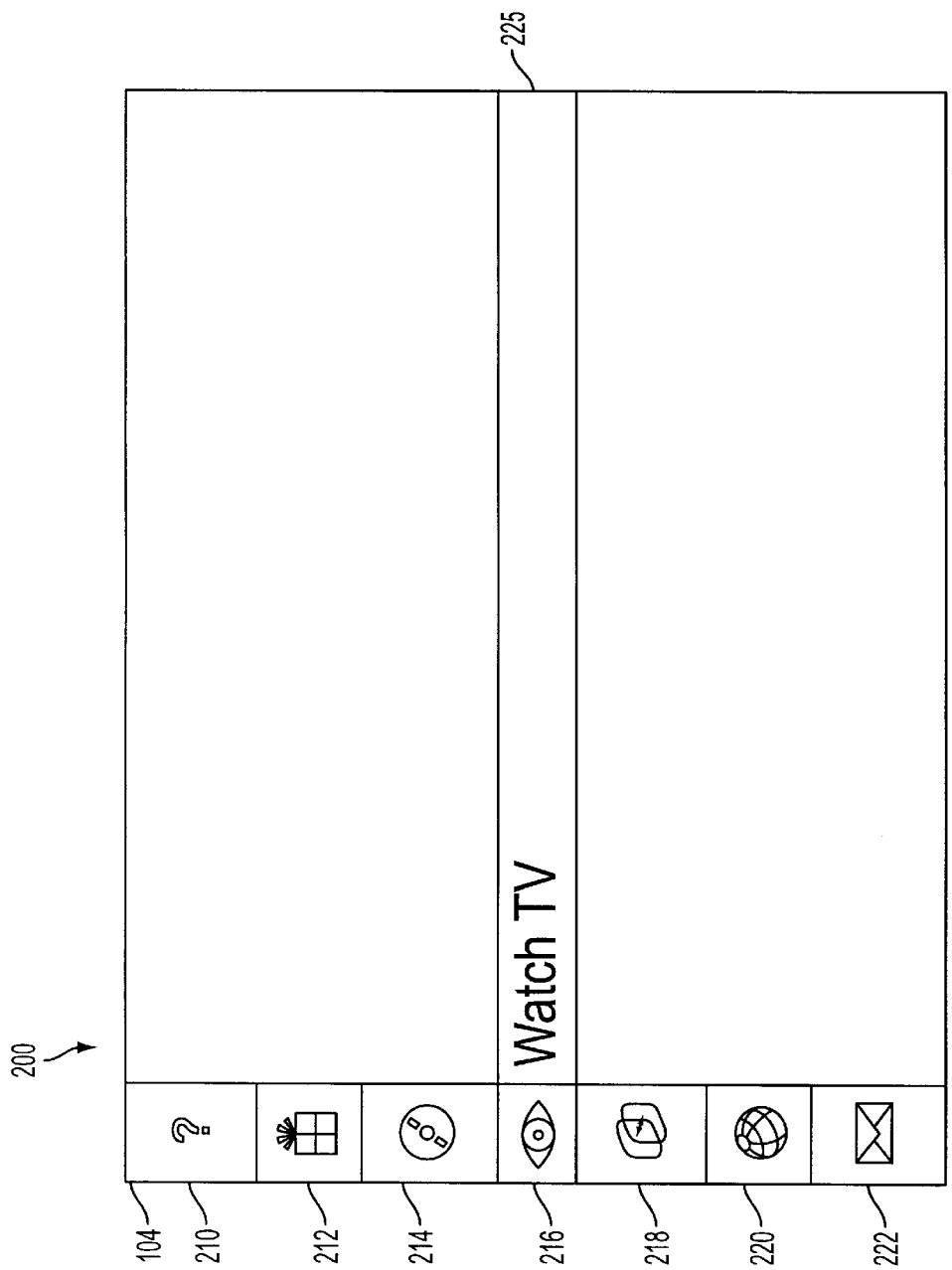

FIG. 7 provides another example of a navigable field expanding to show all the available navigation and selection options arranged as items within a vertically navigable field when the field in the status bar 12 is highlighted. The user has used the scroll cylinder to move the cursor within the GUI 200 from the Device Control Field 108 to Application Field 104, so that Application Field 104 is highlighted (as indicated by the broader white line that surrounds Application Field 104 in Status Bar 102. The application options arranged as items within the list of vertically navigable field 104 include Help Option 210, Shopping Option 212, CD Player Option 214, Television Option 216, VCR Option 218, and World Wide Web (WWW) Option 220. By moving the scroll cylinder up and down within the items 210–220 of the list of vertically navigable field 104, the user can cause the desired Application Option to be moved into Status Bar 102 where it can be selected by depressing scroll cylinder 12, 38. For example, the user has manipulated the scroll cylinder to place Television Option 216 within the Application Field 104 of Status Bar 102 as shown in FIG. 8. Placement of the Television Option 216 within the Application Field 104 of Status Bar 102 causes Television Information Field 225 to display "Watch TV." It is noted that the act of the user scrolling down through items in the navigable Application Field 104 caused an additional option, the Mail Option 222, to appear in the list.

Figure 9:
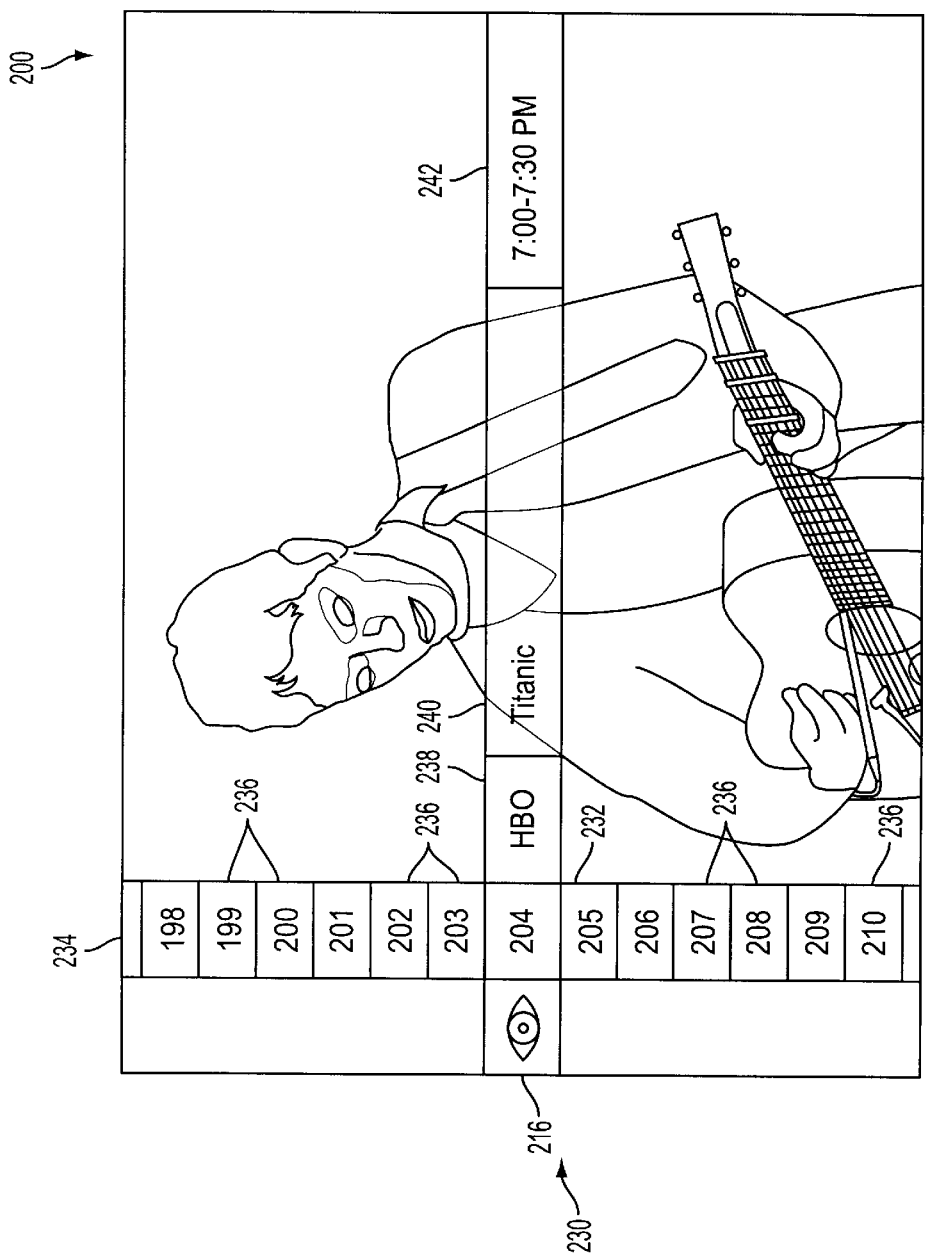

Selection of the Television Option 216 causes the GUI screen of FIG. 9 to be displayed and further causes the AV device being controlled by the remote commander to change from a CD player or changer to a television. The GUI screen has a Television Option status bar 230 with several vertically navigable fields, including Television Option field 216, Channel Number Field 232, Channel Name Field 238, Television Program Title Field 240, and Program Time Field 242. Moving the scroll cylinder horizontally from left-to-right or vice versa will cause the vertically navigable field, with its navigation and selection options arranged in a list, to be displayed when highlighted within the Television Option status bar 230. For example, in this GUI shot, the user has laterally manipulated the scroll cylinder to place the cursor over Channel Number Field 232, thereby highlighting it and causing Channel Number Items 236 to be displayed within list 234 as shown. The viewer can then manipulate the scroll cylinder of the remote commander to scroll up and down the Channel Number list, thereby causing the items 236 in list 234 to move through the stationery cursor located at Channel Number Field 232 in Television Option status bar 230. Moreover, once the user has selected the Television Option 216 in FIG. 8, the television program currently being received by the television AV device is displayed as a "live", moving AV program that is viewable in the background of the GUI 200.

Figure 10:
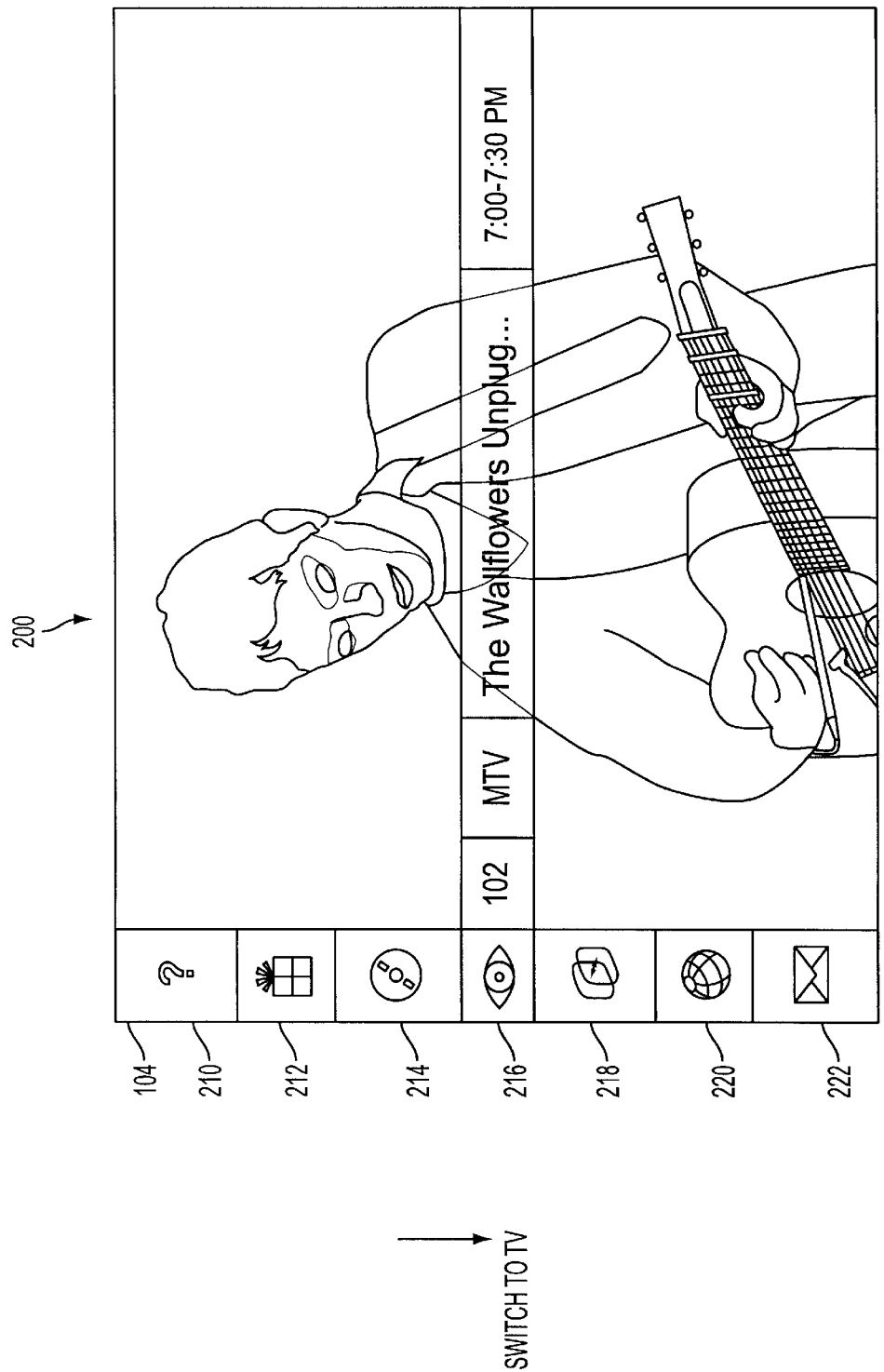

FIG. 10 shows a GUI 200 that results from the viewer using the scroll cylinder remote commander to scroll to and then highlight a new television program for viewing. In this instance, the user has highlighted channel 102 within Channel Screen Field 232. Channel 102 is MTV and the program is "The Wallflowers Unplugged," as indicated in Channel Name Field 238, Program Title Field 240, and Program Time Field 242, respectively. The viewer has laterally manipulated the scroll cylinder of the remote commander from right to left to move the cursor from the Channel Number Field 232 in FIG. 9 to the left-most Application Field 104, which is highlighted in this figure. Now the user can move the scroll cylinder up or down to scroll through the list of items 210–222 of navigable Application Field 102.

Figure 11:
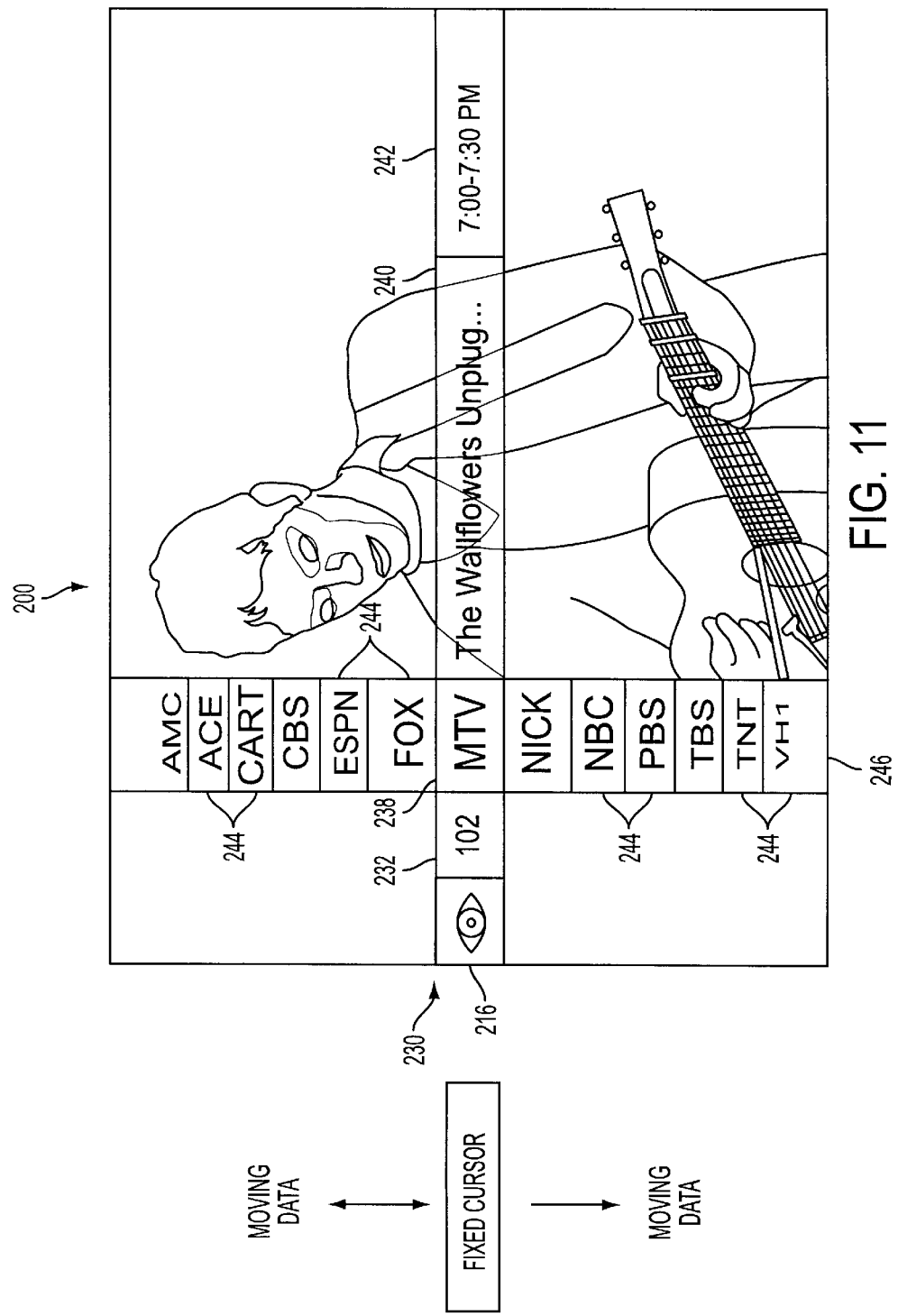

The GUI screen shot illustrated in FIG. 11 was generated by the viewer moving the scroll cylinder 12, 38 from Application Field 104 to Channel Name Field 238. It can be seen that the Channel Name options of Channel Name Field 238 are arranged as items 244 within a vertically arranged list 246 of the field that is navigable and selectable via the scroll cylinder. Again, the user can scroll up or down through the Channel Names. The cursor over Channel Name Field 238 stays stationery while the data of the Channel Names moves through the stationery cursor. When the desired Channel Name is displayed within the stationary cursor over Channel Name Field 238, it may be selected by the user depressing the scroll cylinder.

Figure 12:
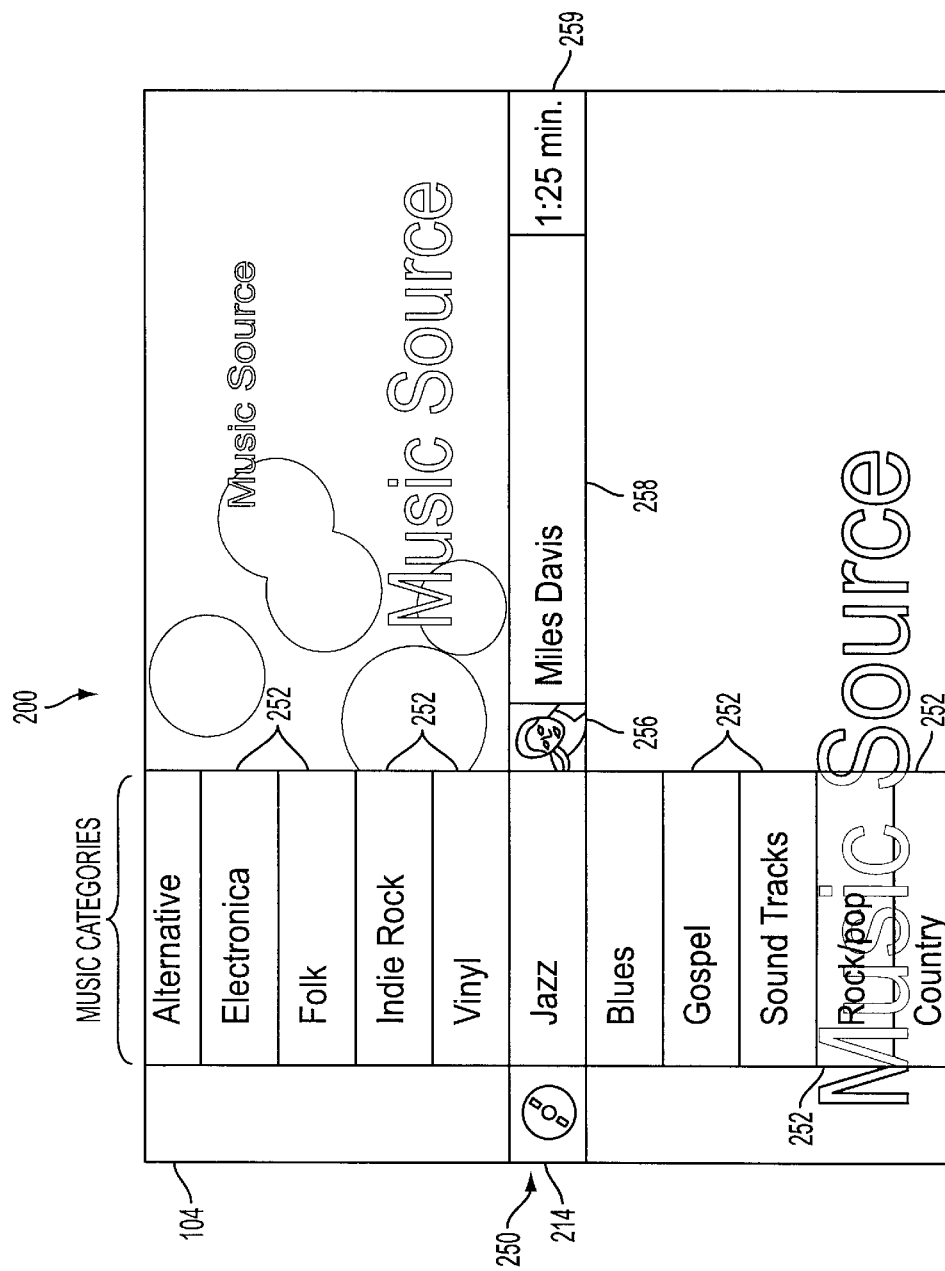

As indicated previously, the user can navigate from one application to another. In FIG. 12, the user has navigated to the CD Player Option 214 from Television Option 216 by moving the scroll cylinder to the left-most field of status bar 230 to highlight Application Field 104 and then scrolling through the choices of Application Field to highlight and select CD Player Option 216. Selection of CD Player Option 216 causes CD Player status bar 250 to be shown in GUI 200. CD Player status bar 250 has a number of navigable fields, including Application Field 216, Music Category Field 256 having a number of music choices (Alternative, Electronica, Folk, Indie Rock, Vinyl, Jazz, Blues, Gospel, Sound Tracks, Rock/pop, Country, etc.) arranged as items 252 in a vertically navigable list 254, Music Title Field 258 which has the artwork associated with the Miles Davis album, and Music Title Length Field 259. Again, these fields, with the exception of the Music Title Length Field 259, are shown as a navigable vertical list of related choices when highlighted by the GUI cursor. If one were to use the scroll mechanism to highlight Music Title Field 258, for instance, a vertically arranged list of available Jazz Music Title Options would be illustrated in that field; the vertically navigable list of the Music Category Field 254 would disappear when the user has navigated from the Music Category Field 254 to the Music Title Field 258.

Figure 13:
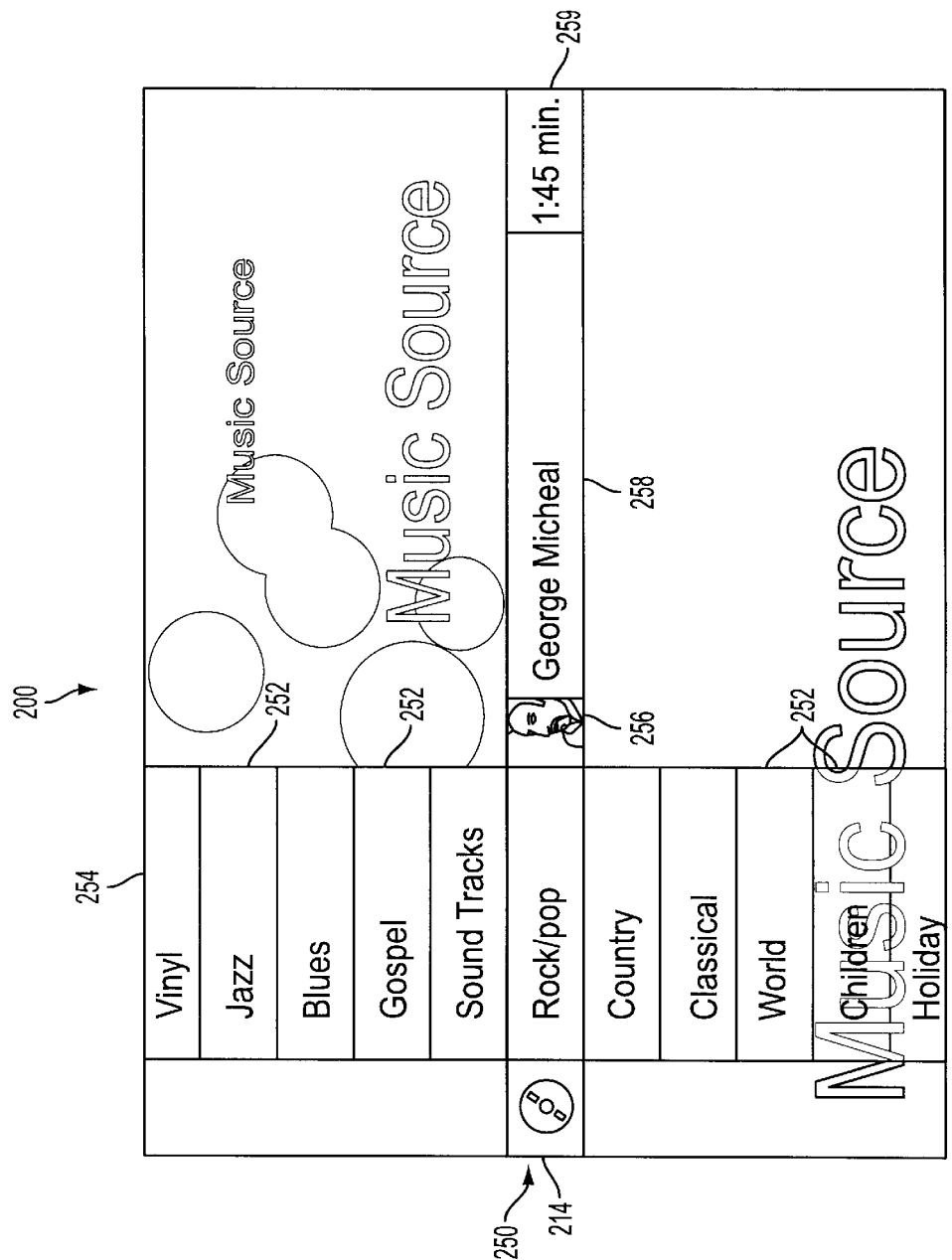
Figure 14:
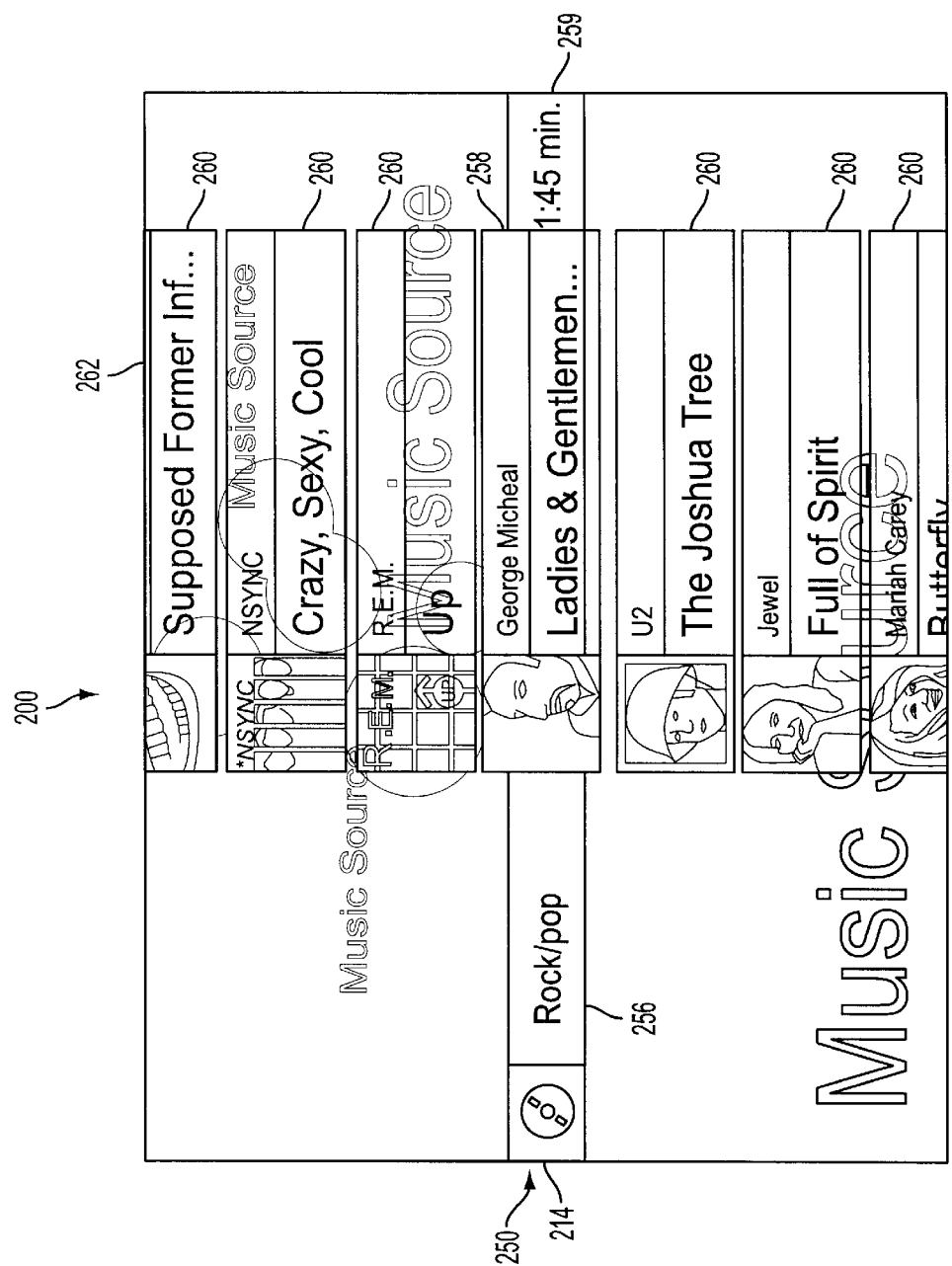

In FIG. 13, the user has used the scroll mechanism 12, 38 to scroll through the list 254 of items 252 of the Music Category Field 256 until the "Rock/pop" choice is highlighted within the Music Category Field 256 of CD Player status bar 250. The album by "George Michael," including the artwork of the album, appears within Music Title Field 258, although additional Rock/pop choices would be displayed in a vertically navigable list of item choices if one were to highlight the Music Title Field 258, as illustrated in FIG. 14. The "George Michael" album has a length of one hour and 45 minutes, as shown in Music Title Length Field 259.

Referring now to FIG. 14, the user has used the scrolling mechanism of the remote commander navigation and selection device to highlight the Music Title Field 258, thereby causing a vertically navigable list 262 of Rock/Pop item choices 260 to be displayed. Among the Rock/pop album items 260 available for navigation and selected in vertically navigable list 262 are the following: "Crazy, Sexy, Cool" by NSYNC, "Up" by R.E.M., "Ladies and Gentlemen . . . " by George Michael, "The Joshua Tree" by U2, "Full of Spirit" by Jewel, and "Butterfly" by Mariah Carey. Music Title Length Field 259 indicates that the George Michael album is one hour and 45 minutes in length. It is noted that note every field of a status bar, such as CD Player status bar 250, is a vertically navigable field. Music Title Length Field 259, for instance, is not a vertically navigable field and simply displays the total length of the album currently highlighted within Music Title Field 258.

The choices (items) of a vertically navigable list of the present invention may also be hypertext links suitable for navigating or "surfing" to a desired location on the Internet; this is particularly suitable for on-line shopping. The user has caused the new status bar 310 of GUI 300 of FIG. 15 to appear by moving the cursor from Music Title Field 258 of status bar 250 to Application Field 104 and manipulating the scrolling mechanism of the remote commander to highlight the Shopping Option 212. Highlighting the Shopping Option causes a status bar 310, specific to Shopping Option 212 to appear in the GUI 300. In addition to Application Field 104, there is Shopping Category Field 312, Shopping Subcategory Field 314 (a subcategory of Shopping Category Field 312), Shopping Item Field 316, and Shopping Item Price Field 318. Shopping Category Field 312, if highlighted, would be a vertically navigable field having a list of shopping category items that may be browsed while in the Shopping Option 212. In addition to the Music item shown in Shopping Category Field 312, other Shopping Category items might include, for example, Movies, Tickets, Clothing, Games, etc. Shopping Subcategory Field 314 is a subcategory of Shopping Category Field 312 in that when highlighted a list of items related to the Shopping Category shown in Field 312 is displayed. For instance, if one were to move the scrolling mechanism of the remote commander to highlight Shopping Subcategory Field 314, a vertically navigable list of item (choices) related to the "Music" Shopping Category 312 would be displayed. Thus, in addition to "Rock/pop," other subcategories of Music might include Jazz, Blues, Gospel, Country, Classical, Children, etc., similar to the items 252 shown in list 254 of FIGS. 12 and 13, for example. Or, if the option highlighted within Shopping Category Field 312 was "Movies" rather than "Music," the Shopping Subcategory Field 314, when highlighted, might consist of a vertically navigable list containing Action, Science Fiction, Black and White, Kung Fu, Drama, etc., as items within the list. Shopping Item Field 316 is a field that, when highlighted, will display items available for purchase within the Subcategory Field 314. Thus for the "Rock/pop" subcategory 314, a navigable list similar to the items 260 of list 262 of Music Title Field 258 in FIG. 14, including the Fiona Apple album currently shown, could be displayed when Shopping Field 316 is highlighted. Finally, Shopping Item Price Field 318 displays the price of the item highlighted within Shopping Field 316 that is for sale; Price Field 318 may be a non-navigable field if there is only one price associated with the item displayed in Shopping Field 316 or Price Field 318 may be a navigable list if there are multiple prices associated with the item displayed in Shopping Field 316 (such as different prices for CD and cassette tape, for instance). It is noted that the fields of Shopping Option status bar 310 are relevant to the item highlighted within Shopping Category Field 312 but would of course change if the item within Shopping Category Field 312 were changed.

Figure 16:
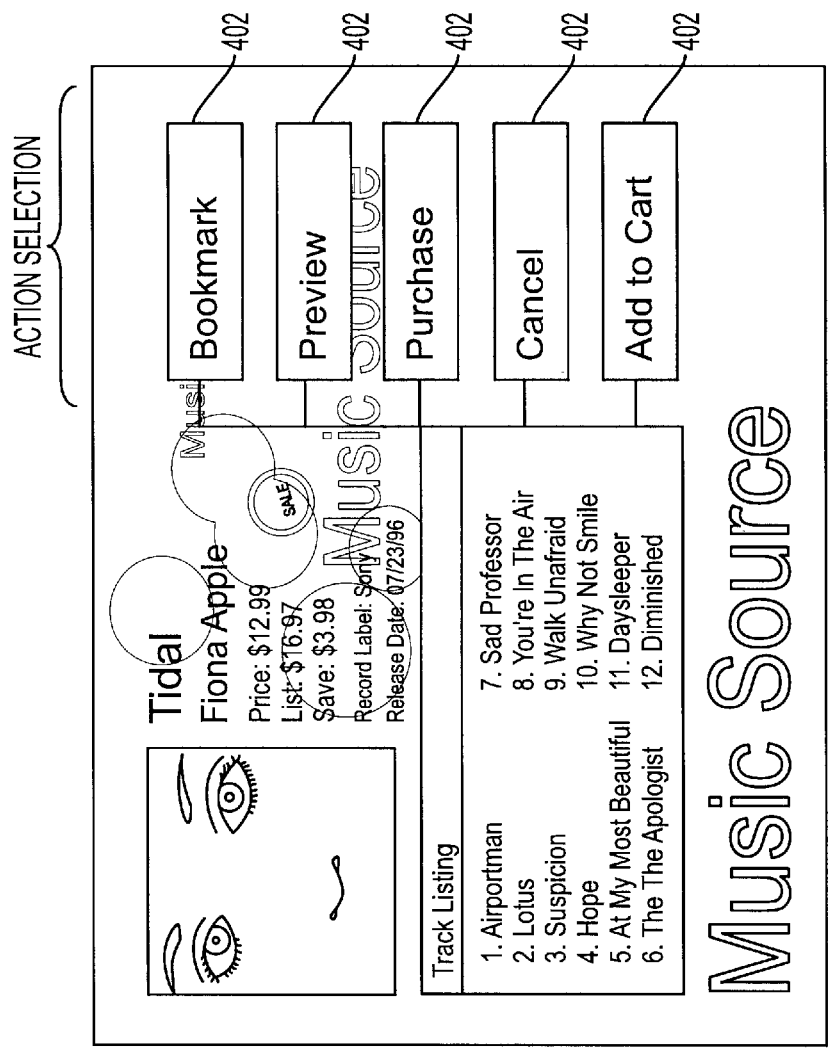

The GUI user can decide to select the items displayed within Shopping Option status bar 310 by pressing down on the scrolling mechanism of the remote commander; the GUI 400 of FIG. 16 will be displayed. The GUI 400 is interesting because the items displayed in a vertically navigable list, namely, "Bookmark," Preview," "Purchase," "Cancel," and "Add to Cart," are hyperlinks 402 that, when selected, automatically navigate to a location on the WWW that allow the function indicated by the hyperlink to be carried out. For example, by the user selecting the "Purchase" hyperlink the user can automatically navigate to a website corresponding to the hyperlink, that allows purchase of Fiona Apple's "Tidal" album.

Figure 15:
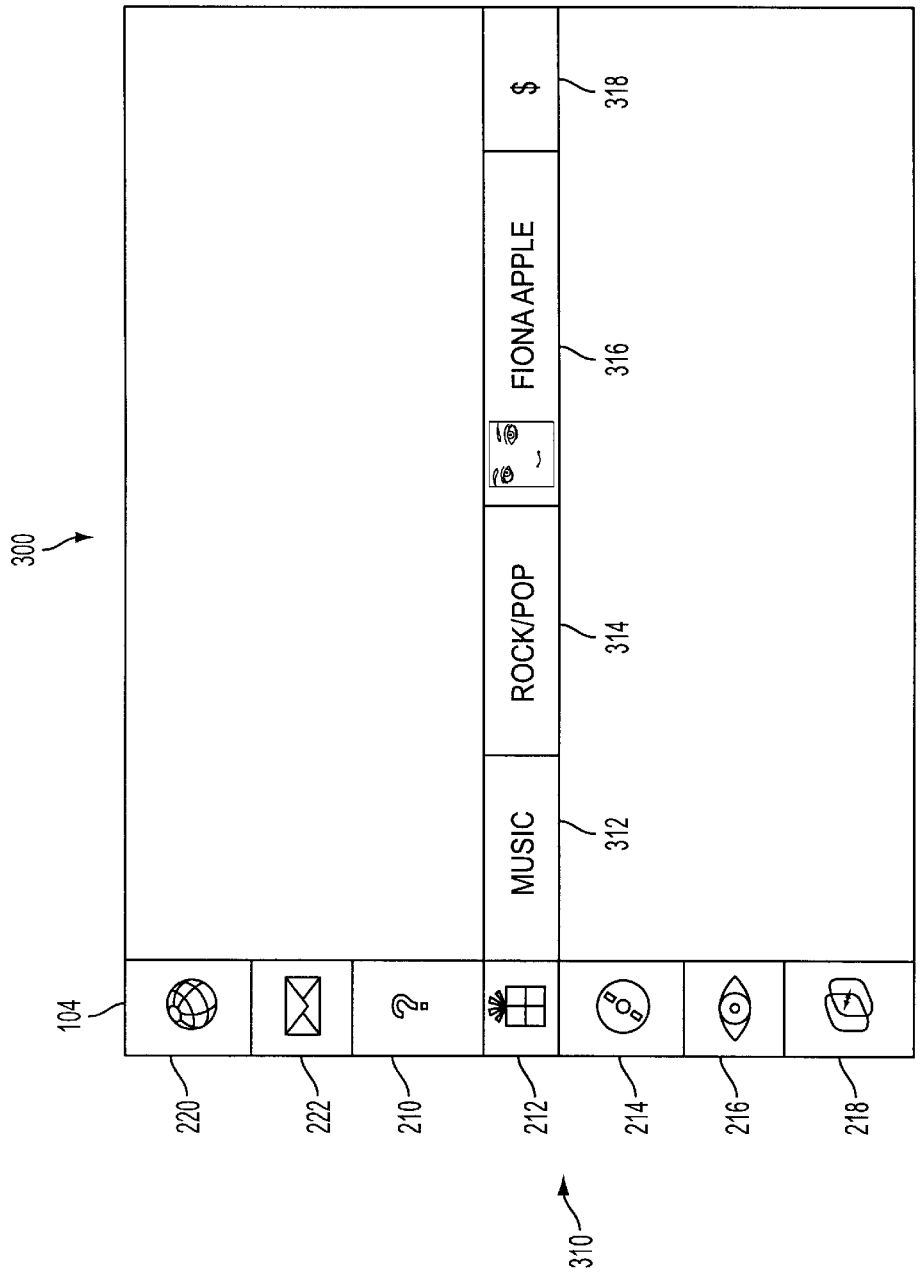
Figure 17:
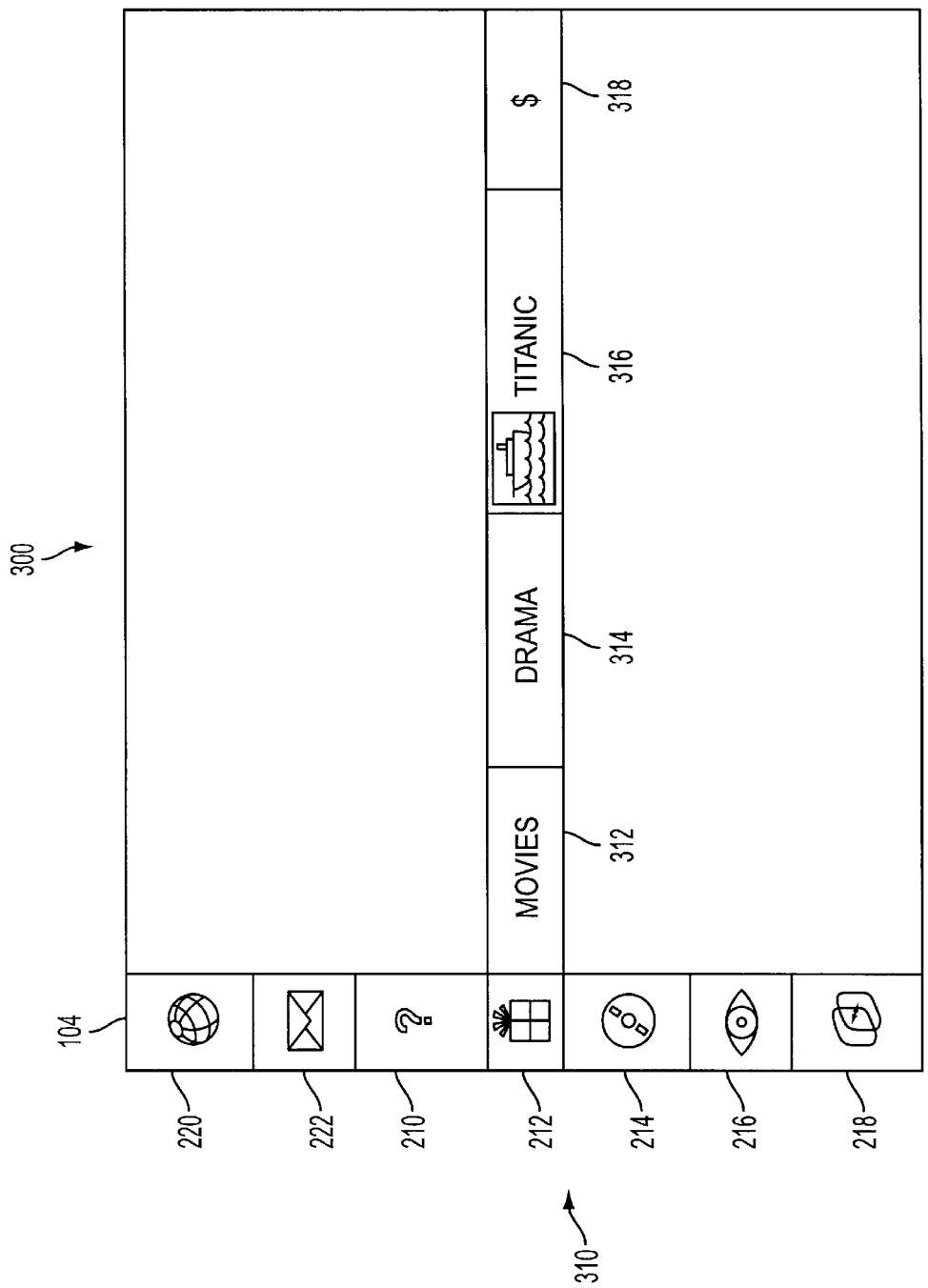
Figure 18:
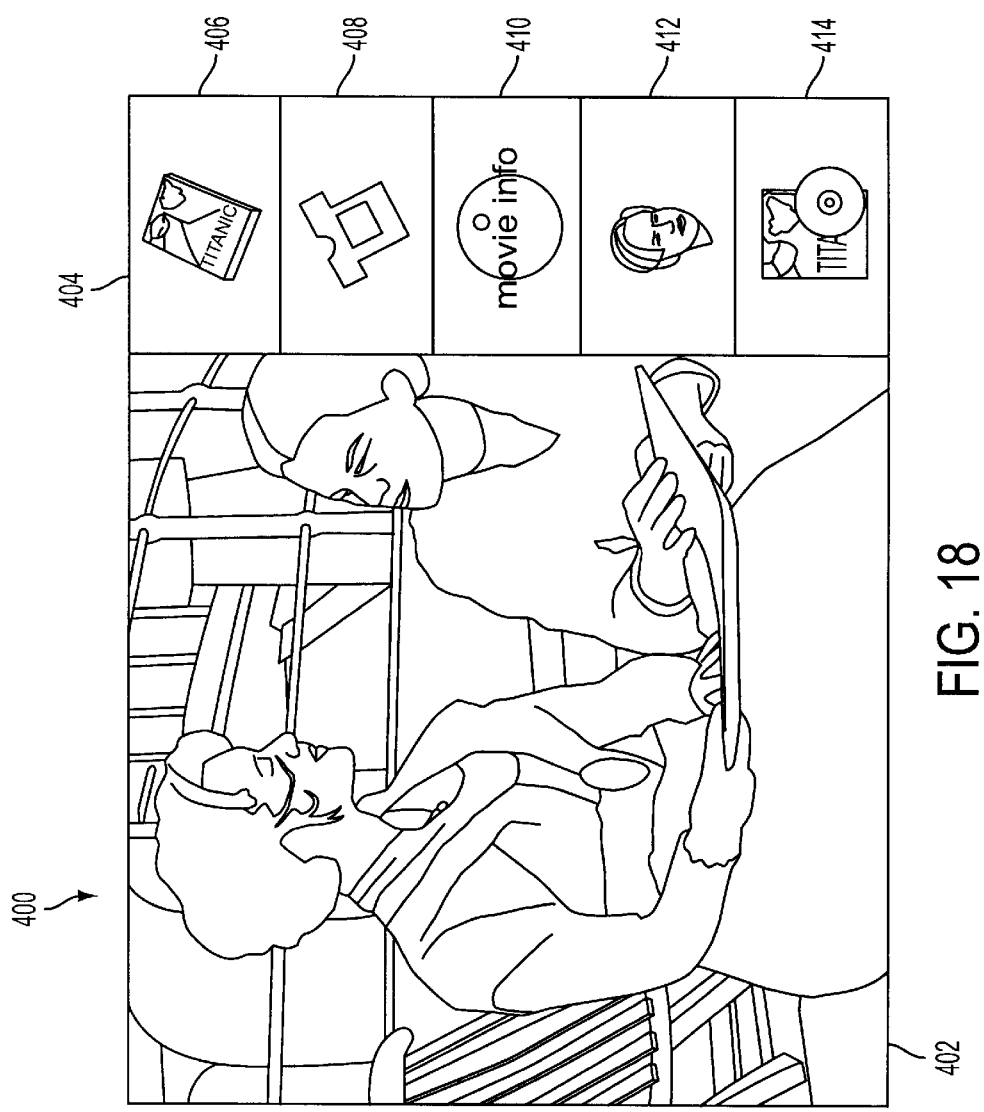

FIGS. 17–18 present a further example of the use of hypertext links as items within a vertically navigable field. In FIGS. 15–16, the Music category 312 of Shopping Option 212 was selected. In FIGS. 17–18, another category of Shopping, "Movies," is selected to generate the status bar 310 of FIG. 17. Status bar 310 has the following fields: Application Field 104, Shopping Category Field 312 (in which the item "Movies" is highlighted), Shopping Subcategory Field 314, Shopping Item Field 316, and Shopping Item Price Field 318. As in FIG. 15, Subcategory Field 314 is a subset of the item displayed in Shopping Category 312, Shopping Item Field 316 is a subset of Subcategory Field 314, and Price Field 318 is a subset of Shopping Item Field 316. In other words, "Movies" is the category, "Drama" is the subcategory, the move "Titanic" is the shopping item, and the price displayed in Field 318 is the price of the movie "Titanic." Again, by using the scrolling mechanism to highlight a field of the status bar 310, the options arranged as items within a vertical list of the field are displayed. In this example, the various types of movies, in addition to "Drama" could be displayed by highlighting Field 314 and all the available Drama movies could be displayed by highlighting Field 316.

Now, when the user selects the choices highlighted within Fields 212, 312, 314, 316, and 318 of status bar 310, the GUI 400 of FIG. 18 is displayed. GUI 400 includes the active video of the movie "Titanic" 402 and additionally includes hyperlinks 406–414 arranged in a vertical list 404 to sites on the Internet at which the functionality indicated by the hyperlinks may be carried out. Hyperlink 406, with a picture of a Titanic VCR tape, can be chosen to navigate to an Internet site at which the movie may be purchased. Hyperlink 408, which displays a T-shirt with a scene from the movie, can be selected to navigate to an Internet site at which movie-related merchandising, such as clothing, posters, etc., may be purchased. Hyperlink 410 displays a globe with the text "movie info" and can be selected to navigate to an Internet site where the user can find out more about the movie "Titanic." Hyperlink 412 displays a picture of actor Leonardo DiCaprio and this hyperlink can be selected to navigate to a website that will tell the user more about the actor and where actorrelated products may be purchased, such as a fan club site on the Internet. Hyperlink 414 displays a CD and CD cover artwork, and may be selected to navigate to a site where the score the movie may be purchased. It is interesting to note that in this example, only one navigable list 404 of AV options is available and is thus always displayed when the user navigates to this site. Hyperlinks 406, 408, 412, and 414 provide an example in which the hyperlink items of vertically navigable list 404 are solely visual in nature and, indeed, illustrate that they need not be textbased at all.

Figure 19:
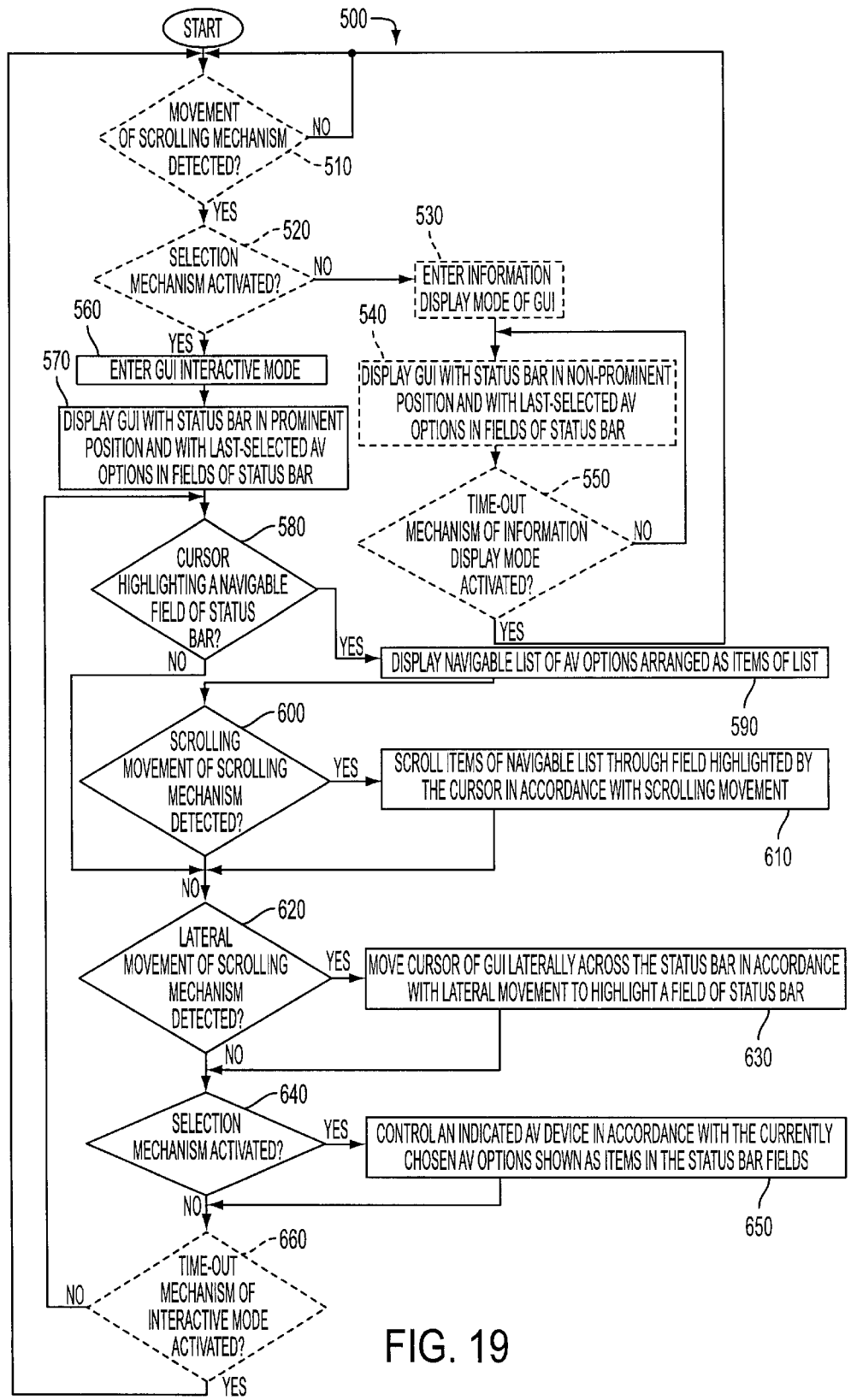
FIG. 19 is a flow diagram of the methodology of the present invention.

FIG. 19 is a flow diagram 500 that illustrates the methodology of the present invention. This methodology may be implemented as executable computer program instructions of a computer readable medium that when executed by a processing system, such as might reside within navigation and selection device 54, for instance, cause the processing system to provide efficient navigation of AV options in an AV system. At Decision Block 510, the inquiry is whether movement of the scrolling mechanism has been detected by the management software 50 since movement of the scrolling mechanism is needed to enter either the information display mode or the interactive mode of the GUI. If no movement has been detected, then the inquiry of Decision Block 510 is repeated in order that any subsequent movement may be detected. If movement of the scrolling mechanism is detected, then the inquiry at Decision Block 520 is whether the selection mechanism of the navigation and detection device has been activated. As previously described, the selection mechanism and scrolling may be the same (although this is note required), as in the case of the above-described scroll cylinder which provides lateral movement, scrolling movement, and a selection means. The selection mechanism could be a button of the navigation and selection device, for instance, and would thus be distinct from the scrolling mechanism. If activation of the selection mechanism has not occurred but movement of the scrolling mechanism has been detected, then the management software 50 causes the information display mode of the GUI to be entered at Block 530. At Block 540, in the information display mode the GUI is displayed on the display apparatus 60 with the status bar located in a non-prominent position of the GUI screen and the last-selected AV options are displayed in the fields of the status bar. At Decision Block 550, an inquiry into whether the time-out mechanism of the information display mode has been activated ensures that after a predetermined period of time, such as four seconds, the GUI will no longer be displayed. It is noted that Blocks 510–550 of flow 500 are optional, as indicated by the dashed lines. The GUI interactive mode may be directly entered without first entering the GUI information display mode by the user activating the selection mechanism without first moving the scrolling mechanism of the navigation and selection device. The interactive mode may be directly entered by depressing the scroll cylinder shown in FIGS. 1–2, for instance.

Referring back to Decision Block 520, if the selection mechanism has been activated the GUI interactive mode is entered at Block 560. The GUI with status bar is prominently displayed within the GUI and the last-selected AV options are displayed in the fields of the status bar, as shown in Block 570. At Decision Block 580, the inquiry is whether the field of the status bar that is highlighted by the GUI cursor is a navigable field. If so, then at Block 590 management software 50 causes the AV options arranged as items 66 of the list 68 of the navigable field to be displayed on the display apparatus 60; the AV options arranged as items within the list are provided by the appropriate database, either local 49 or remote 42 (including over the Internet). At Decision Block 600, whether scrolling movement of the scrolling mechanism is detected, caused by the user using the scrolling mechanism to scroll in an up and/or down direction, is the inquiry. If scrolling movement is detected, then at Block 610 items of the navigable list are scrolled through the highlighted field in accordance with the scrolling movement. This permits a particular AV option item within a list associated with a field to be placed within the highlighted field. At Decision Block 620, the inquiry is whether lateral movement of the scrolling mechanism is detected. If so, then at Block 630, the management software causes GUI cursor to move laterally across the status bar in accordance with the lateral movement of the scrolling mechanism. This allows a new field within the status bar to be highlighted if desired. It is noted that the order to Decision Blocks 600 and 620 may be reversed without departing from the spirit and scope of the invention. At Decision Block 640, management software 50 determines whether the selection mechanism of the navigation and selection device 54 has been activated. If so, indicating that the AV options currently chosen and displayed within the fields of the status bar are to be implemented, then software 50 at Block 650 controls the AV device 52 indicated by the status bar and in the manner indicated by the fields of the status bar. Finally, Decision Block 660 causes the methodology of Blocks 580–650 to be repeated unless a time-out mechanism of the interactive mode has been activated, in which case, the flow returns to the beginning.

While the invention has been particularly shown and described with reference to a preferred embodiment, it will be understood by those skilled in the art that various changes in form and detail may be made therein without departing from the spirit and scope of the invention. For instance, while vertical navigation of AV options has been described in connection with the preferred embodiment, it is recognized that the present invention also encompasses non-vertical navigation such as horizontal navigation which may be effected by utilizes an vertically arranged status bar in the GUI.

What is claimed is:

1. In an audio/visual (AV) system, a method for efficient navigation of AV options available to a user of the AV system, comprising:

a) entering an interactive mode of a graphical user interface (GUI), displayed on a display apparatus of the AV system, in response to a user of the AV system activating a selection mechanism of a navigation and selection device of the AV system;

b) displaying a status bar in a prominent position of the GUI, wherein the status bar has a plurality of last-selected AV options displayed as last-selected items within a corresponding plurality of fields, with one or more fields of the plurality of fields being navigable fields;

c) laterally moving a cursor of the GUI across the plurality of fields of the status bar to place the cursor over a field of the plurality of fields and thus highlight the field in response to the user laterally moving a scrolling mechanism of the navigation and selection device;

d) displaying a navigable list of the highlighted field having a plurality of items corresponding to a plurality of related AV options, if the highlighted field is a navigable field of the one or more navigable fields of the plurality of fields of the status bar;

e) scrolling the plurality of items of the navigable list through the highlighted field to cause a desired item of the plurality of items to be highlighted within the highlighted field in response to the user scrolling the scrolling mechanism of the navigation and selection device;

f) repeating c)–e) as needed for other fields of the plurality of fields of the status bar to place a plurality of currently chosen AV options within the plurality of fields of the status bar;

g) selecting the plurality of currently chosen AV options highlighted within the fields of the status bar by activating the selection mechanism of the navigation and selection device;

h) in response to selecting, controlling an AV device of the AV system in accordance with the currently chosen AV options that were selected;

i) wherein prior to entering the interactive mode, further comprising:

entering an information display mode of the GUI in response to the user moving the scrolling mechanism without activating the selection mechanism of the navigation and selection device;

displaying the status bar within a non-prominent position of the GUI, with the plurality of fields of the status bar containing a plurality of last-selected AV options; and j) wherein subsequently entering the interactive mode of the GUI from the information display mode causes the status bar of the GUI to move from the non-prominent position to a prominent position of the GUI.

2. The method of claim 1, wherein the plurality of related AV options are provided by downloading the plurality of related AV options from a database of the AV system.

3. The method of claim 1, wherein the plurality of related AV options comprise one or more hyperlinks to one or more locations on the Internet.

4. The method of claim 1, wherein the navigation and selection device performs controlling the AV device.

5. The method of claim 1, further comprising:

if a time-out mechanism of the interactive mode has not been activated, repeating c)–g).

6. The method of claim 1, further comprising:

if a time-out mechanism of the interactive mode has been activated, causing the GUI to not be displayed on the display apparatus of the AV system.

7. The method of claim 1, wherein if a time-out mechanism of the information display mode is activated, the GUI is no longer displayed on the display apparatus.

8. A computer readable medium containing executable instructions which, when executed in a processing system, causes the system to provide for efficient navigation of available audio/visual (AV) options in an AV system, comprising:

a) instructions for entering an interactive mode of a graphical user interface (GUI), that is displayed on a display apparatus of the AV system, in response to a user of the AV system activating a selection mechanism of a navigation and selection device of the AV system;

b) instructions for displaying a status bar in a prominent position of the GUI, wherein the status bar has a plurality of last-selected AV options displayed as last-selected items within a corresponding plurality of fields, with one or more fields of the plurality of fields being navigable fields and with the GUI having a cursor that highlights one field of the plurality of fields at a given time;

c) if the cursor of the GUI is highlighting a navigable field of the one or more navigable fields, instructions for displaying a list of items, corresponding to a plurality of related AV options, of the navigable field;

d) if scrolling movement of the scrolling mechanism within the highlighted navigable field is detected, instructions for scrolling the list of items through the highlighted navigable filed in accordance with the scrolling movement;

e) if lateral movement of the scrolling mechanism is detected, instructions for laterally moving the cursor across the plurality of fields of the status bar in accordance with the lateral movement;

f) repeating c)–e) for any field of the plurality of fields of the status bar as needed to place a plurality of currently chosen AV options within the plurality of fields of the status bar;

g) if the selection mechanism of the navigation and selection device of the AV system is activated, instructions for controlling an AV device of the AV system in accordance with the currently chosen AV options that were selected;

h) wherein prior to entering the interactive mode, further comprising:

if movement of the scrolling mechanism is detected and the selection mechanism has not been activated, instructions for entering an information display mode of the GUI;

instructions for displaying the status bar within a non-prominent position of the GUI, with the plurality of fields of the status bar containing a plurality of last-selected AV options; and i) wherein subsequently executing instructions for entering the interactive mode of the GUI from the information display mode causes the status bar of the GUI to move from the non-prominent position to a prominent position of the GUI.

9. The medium of claim 8, wherein the plurality of related AV options are provided by instructions for downloading the plurality of related AV options from a database of the AV system.

10. The medium of claim 8, wherein the plurality of related AV options comprise one or more hyperlinks to one or more locations on the Internet.

11. The medium of claim 8, wherein the navigation and selection device performs controlling the AV device.

12. The medium of claim 8, further comprising:

if a time-out mechanism of the interactive mode has not been activated, repeating c)–g).

13. The medium of claim 8, further comprising:

if a time-out mechanism of the interactive mode has been activated, instructions for causing the GUI to not be displayed on the display apparatus of the AV system.

14. In an audio/visual (AV) system, a method for navigation of AV options available to a user of the AV system, comprising:

a) entering an interactive mode of a graphical user interface (GUI), that is displayed on a display apparatus of the AV system, in response to a user of the AV system activating a selection mechanism of a navigation and selection device of the AV system;

b) displaying a status bar in a prominent position of the GUI, wherein the status bar has a plurality of last-selected AV options displayed as last-selected items within a corresponding plurality of fields, with one or more fields of the plurality of fields being navigable fields and with the GUI having a cursor that highlights one field of the plurality of fields at a given time;

c) if the cursor of the GUI is highlighting a navigable field of the one or more navigable fields, displaying a list of items, corresponding to a plurality of related AV options, of the navigable field;

d) if scrolling movement of a scrolling cylinder within the highlighted navigable field is detected, scrolling the list of items through the highlighted navigable field in accordance with the scrolling movement;

e) if lateral movement of the scrolling cylinder is detected, laterally moving the cursor across the plurality of fields of the status bar in accordance with the lateral movement;

f) repeating c)–e) for any field of the plurality of fields of the status bar as needed to place a plurality of currently chosen AV options within the plurality of fields of the status bar;

g) if the selection mechanism of the navigation and selection device of the AV system is activated, controlling an AV device of the AV system in accordance with the currently chosen AV options that were selected; and h) wherein subsequently entering the interactive mode of the GUI from the information display mode causes the status bar of the GUI to move from the non-prominent position to a prominent position of the GUI.

15. The method of claim 14, wherein the plurality of related AV options are provided by downloading the plurality of related AV options from a database of the AV system.

16. The method of claim 14, wherein the plurality of related AV options comprise one or more hyperlinks to one or more locations on the Internet.

17. The method of claim 14, wherein the navigation and selection device performs controlling the AV device.

18. The method of claim 14, further comprising:
if a time-out mechanism of the interactive mode has not been activated, repeating c)–g).

19. The method of claim 14, further comprising:
if a time-out mechanism of the interactive mode has been activated, causing the GUI to not be displayed on the display apparatus of the AV system.

20. The method of claim 14, wherein prior to entering the interactive mode, further comprising:
if movement of the scrolling cylinder is detected and the selection mechanism has not been activated, entering an information display mode of the GUI; and
displaying the status bar within a non-prominent position of the GUI, with the plurality of fields of the status bar containing a plurality of last-selected AV options.

21. The method of claim 14, wherein if a time-out mechanism of the information display mode is activated, the GUI is no longer displayed on the display apparatus of the AV system.

22. In an audio/visual (AV) system, a method for efficient navigation of AV options available to a user of the AV system, comprising:

a) entering an interactive mode of a graphical user interface (GUI), that is displayed on a display apparatus of the AV system, in response to a user of the AV system activating a selection mechanism of a navigation and selection device of the AV system;

b) displaying a status bar in a prominent position of the GUI, wherein the status bar has a plurality of last-selected AV options displayed as last-selected items within a corresponding plurality of fields, with one or more fields of the plurality of fields being navigable fields and with the GUI having a cursor that highlights one field of the plurality of fields at a given time;

c) if the cursor of the GUI is highlighting a navigable field of the one or more navigable fields, displaying a list of items, corresponding to a plurality of related AV options, of the navigable field;

d) if scrolling movement of the scrolling mechanism within the highlighted navigable field is detected, scrolling the list of items through the highlighted navigable field in accordance with the scrolling movement;

e) if lateral movement of the scrolling mechanism is detected, laterally moving the cursor across the plurality of fields of the status bar in accordance with the lateral movement;

f) repeating c)–e) for any field of the plurality of fields of the status bar as needed to place a plurality of currently chosen AV options within the plurality of fields of the status bar;

g) if the selection mechanism of the navigation and selection device of the AV system is activated, controlling an AV device of the AV system in accordance with the currently chosen AV options that were selected; and h) wherein subsequently entering the interactive mode of the GUI from the information display mode causes the status bar of the GUI to move from the nonpprominent position to a prominent position of the GUI.

23. A graphical user interface (GUI), dynamically displayed on a display apparatus of an audio/visual (AV) system, that is controlled by a navigation and selection device of the AV system to provide efficient navigation of AV options available to a user of the AV system, comprising:

a status bar of the GUI having a plurality of fields, with one or more fields of the plurality of fields being navigable fields and with each navigable field having AV options that are displayed when highlighted;

a cursor of the GUI capable of highlighting any field of the plurality of fields of the status bar;

an interactive mode of the GUI;

wherein response to a user of the AV system activating a selection mechanism of the navigation and selection device, the interactive mode of the GUI is entered and the GUI is displayed on the display apparatus with the status bar of the GUI being displayed in a prominent location of the GUI and initially having a plurality of last-selected AV options displayed as items within the corresponding plurality of fields of the status bar;

wherein if a field of the plurality of fields is a navigable field a plurality of AV options arranged as a plurality of items within a list of the navigable field is displayed on the display apparatus and the plurality of items within the list of the navigable field can be navigated by the user moving the scrolling wheel in a scrolling movement to cause the plurality of items to scroll through the field of the status bar;

wherein by moving the scrolling mechanism in a lateral movement, the user can determine which field of the plurality of fields of the status bar will be highlighted and thus available for navigating if navigable;

wherein in response to the user activating a selection mechanism of the navigation and selection device, an AV device of the AV system is controlled by the navigation and selection device in accordance with the plurality of AV options currently within the plurality of fields of the status at the time the selection mechanism is activated;

an information display mode of the GUI that is entered prior to entering the interactive mode in response to the user moving the scrolling mechanism without activating the selection mechanism of the navigation and selection device, in which the status bar is displayed within a non-prominent position of the GUI, with the plurality of fields of the status bar containing a plurality of last-selected AV options; and wherein subsequently entering the interactive mode of the GUI from the information display mode causes the status bar of the GUI to move from the non-prominent position to a prominent position of the GUI.

24. An audio/visual (AV) system that provides for efficient navigation of AV options available to a user of the AV system, comprising:

a plurality of AV options stored in a database of the AV system;

a server of the AV system that can access the plurality of AV options stored in the database;

a navigation and selection device having a scrolling mechanism integral to the navigation and selection device that is capable of lateral movement and scrolling movement, a selection mechanism and a management program;

a display apparatus;

one or more AV devices controllable by the navigation and selection device in accordance with the management program;

a graphical user interface (GUI), controlled by a user of the AV system through the navigation and selection device in accordance with the management program and displayed on the display apparatus when activated in an interactive mode;

wherein while in the interactive mode and in response to the user moving the scrolling mechanism of the navigation and selection device, one or more navigable fields of a status bar arranged as related items in lists capable of being navigated are selectively displayed when highlighted by a cursor of the GUI and may be navigated to select a set of desired AV options from a plurality of available AV options;

wherein selection of the set of desired AV options causes an AV device indicated by the set of desired AV options to be controlled by the navigation and selection device in accordance with the desired AV options;

wherein the GUI further comprises an information display mode that is entered in response to the user moving the scrolling mechanism without activating the selection mechanism of the scrolling mechanism, wherein upon entry into the information display mode the status bar is displayed in a non-prominent position of the GUI; and wherein upon entry into the interactive mode from the information display mode the status bar moves from the non-prominent position to a prominent position of the GUI.

25. In an audio/visual (AV) system, a method for navigation of AV options available to a user of the AV system, comprising:

a) entering an interactive mode of a graphical user interface (GUI), displayed on a display apparatus of the AV system, in response to a user of the AV system activating a selection mechanism of a navigation and selection device of the AV system;

b) displaying a status bar in a prominent position of the GUI, wherein the status bar has a plurality of last-selected AV options displayed as last-selected items within a corresponding plurality of fields, with one or more fields of the plurality of fields being navigable fields;

c) laterally moving a cursor of the GUI across the plurality of fields of the status bar to place the cursor over a field of the plurality of fields and thus highlight the field in response to the user laterally moving a scrolling cylinder of the navigation and selection device;

d) displaying a navigable list of the highlighted field having a plurality of items corresponding to a plurality of related AV options, if the highlighted field is a navigable field of the one or more navigable fields of the plurality of fields of the status bar;

e) scrolling the plurality of items of the navigable list through the highlighted field to cause a desired item of the plurality of items to be highlighted within the highlighted field in response to the user scrolling the scrolling cylinder of the navigation and selection device;

f) repeating c)–e) as needed for other fields of the plurality of fields of the status bar to place a plurality of currently chosen AV options within the plurality of fields of the status bar;

g) selecting the plurality of currently chosen AV options highlighted within the fields of the status bar by activating the selection mechanism of the navigation and selection device;

h) in response to selecting, controlling an AV device of the AV system in accordance with the currently chosen AV options that were selected;

i) wherein prior to entering the interactive mode, further comprising:

entering an information display mode of the GUI in response to the user moving the scrolling cylinder without activating the selection mechanism of the navigation and selection device;

displaying the status bar within a non-prominent position of the GUI, with the plurality of fields of the status bar containing a plurality of last-selected AV options; and j) wherein subsequently entering the interactive mode of the GUI from the information display mode causes the status bar of the GUI to move from the non-prominent position to a prominent position of the GUI.

26. A computer readable medium containing executable instructions which, when executed in a processing system, causes the system to provide for navigation of available audio/visual (AV) options in an AV system, comprising:

a) instructions for entering an interactive mode of a graphical user interface (GUI), that is displayed on a display apparatus of the AV system, in response to a user of the AV system activating a selection mechanism of a navigation and selection device of the AV system;

b) instructions for displaying a status bar in a prominent position of the GUI, wherein the status bar has a plurality of last-selected AV options displayed as last-selected items within a corresponding plurality of fields, with one or more fields of the plurality of fields being navigable fields and with the GUI having a cursor that highlights one field of the plurality of fields at a given time;

c) if the cursor of the GUI is highlighting a navigable field of the one or more navigable fields, instructions for displaying a list of items, corresponding to a plurality of related AV options, of the navigable field;

d) if scrolling movement of a scrolling cylinder within the highlighted navigable field is detected, instructions for scrolling the list of items through the highlighted navigable field in accordance with the scrolling movement;

e) if lateral movement of the scrolling cylinder is detected, instructions for laterally moving the cursor across the plurality of fields of the status bar in accordance with the lateral movement;

f) repeating c)–e) for any field of the plurality of fields of the status bar as needed to place a plurality of currently chosen AV options within the plurality of fields of the status bar;

g) if the selection mechanism of the navigation and selection device of the AV system is activated, instructions for controlling an AV device of the AV system in accordance with the currently chosen AV options that were selected;

h) wherein prior to entering the interactive mode, further comprising:
if movement of the scrolling cylinder is detected and the selection mechanism has not been activated, instructions for entering an information display mode of the GUI;
instructions for displaying the status bar within a non-prominent position of the GUI, with the plurality of fields of the status bar containing a plurality of last-selected AV options; and i) wherein subsequently executing instructions for entering the interactive mode of the GUI from the information display mode causes the status bar of the GUI to move from the non-prominent position to a prominent position of the GUI.

27. A graphical user interface (GUI), dynamically displayed on a display apparatus of an audio/visual (AV) system, that is controlled by a navigation and selection device of the AV system to provide navigation of AV options available to a user of the AV system, comprising:

a status bar of the GUI having a plurality of fields, with one or more fields of the plurality of fields being navigable fields and with each navigable field having AV options that are displayed when highlighted;

a cursor of the GUI capable of highlighting any field of the plurality of fields of the status bar;

an interactive mode of the GUI;

wherein in response to a user of the AV system activating a selection mechanism of the navigation and selection device, the interactive mode of the GUI is entered and the GUI is displayed on the display apparatus with the status bar of the GUI being displayed in a prominent location of the GUI and initially having a plurality of last-selected AV options displayed as items within the corresponding plurality of fields of the status bar;

wherein if a field of the plurality of fields is a navigable field a plurality of AV options arranged as a plurality of items within a list of the navigable field is displayed on the display apparatus and the plurality of items within the list of the navigable field can be navigated by the user moving a scrolling cylinder in a scrolling movement to cause the plurality of items to scroll through the field of the status bar;

wherein by moving the scrolling cylinder in a lateral movement, the user can determine which field of the plurality of fields of the status bar will be highlighted and thus available for navigating if navigable;

wherein in response to the user activating a selection mechanism of the navigation and selection device, an AV device of the AV system is controlled by the navigation and selection device in accordance with the plurality of AV options currently within the plurality of fields of the status at the time the selection mechanism is activated;

an information display mode of the GUI that is entered prior to entering the interactive mode in response to the user moving the scrolling cylinder without activating the selection mechanism of the navigation and selection device, in which the status bar is displayed within a non-prominent position of the GUI, with the plurality of fields of the status bar containing a plurality of last-selected AV options; and wherein subsequently entering the interactive mode of the GUI from the information display mode causes the status bar of the GUI to move from the non-prominent position to a prominent position of the GUI.

28. An audio/visual (AV) system that provides for navigation of AV options available to a user of the AV system, comprising:

a plurality of AV options stored in a database of the AV system;

a server of the AV system that can access the plurality of AV options stored in the database;

a navigation and selection device having a scrolling cylinder integral to the navigation and selection device that is capable of lateral movement and scrolling movement, a selection mechanism and a management program;

a display apparatus;

one or more AV devices controllable by the navigation and selection device in accordance with the management program;

a graphical user interface (GUI), controlled by a user of the AV system through the navigation and selection device in accordance with the management program and displayed on the display apparatus when activated in an interactive mode;

wherein while in the interactive mode and in response to the user moving the scrolling cylinder of the navigation and selection device, one or more navigable fields of a status bar arranged as related items in lists capable of being navigated are selectively displayed when highlighted by a cursor of the GUI and may be navigated to select a set of desired AV options from a plurality of available AV options;

wherein selection of the set of desired AV options causes an AV device indicated by the set of desired AV options to be controlled by the navigation and selection device in accordance with the desired AV options;

wherein the GUI further comprises an information display mode that is entered in response to the user moving the scrolling cylinder without activating the selection mechanism of the scrolling cylinder, wherein upon entry into the information display mode the status bar is displayed in a non-prominent position of the GUI; and wherein upon entry into the interactive mode from the information display mode the status bar moves from the non-prominent position to a prominent position of the GUI.

* * * * *

UNITED STATES PATENT AND TRADEMARK OFFICE
CERTIFICATE OF CORRECTION

PATENT NO. : 6,690,391 B1
DATED : February 10, 2004
INVENTOR(S) : Andrew Proehl et al.

Page 1 of 1

It is certified that error appears in the above-identified patent and that said Letters Patent is hereby corrected as shown below:

Column 3,
Line 56, delete ".".

Column 5,
Line 20, delete "shownremote" and insert -- shown – remote -- therefor.

Column 7,
Line 37, delete "rightmost" and insert -- right-most -- therefor.

Column 12,
Line 57, delete "actorrelated" and insert -- actor-related -- therefor.
Line 67, delete "textbased" and insert -- text-based -- therefor.

Column 18,
Line 16, delete "nonpprominent" and insert -- non-prominent -- therefor.
Line 30, after "wherein", insert -- in --.

Signed and Sealed this

Sixth Day of September, 2005

JON W. DUDAS
*Director of the United States Patent and Trademark Office*